(12) United States Patent
Dudar

(10) Patent No.: US 10,850,587 B2
(45) Date of Patent: Dec. 1, 2020

(54) SYSTEM AND METHOD FOR EVAPORATIVE EMISSIONS DETECTION

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 464 days.

(21) Appl. No.: 15/730,618

(22) Filed: Oct. 11, 2017

(65) Prior Publication Data

US 2019/0105960 A1 Apr. 11, 2019

(51) Int. Cl.
*B60G 17/0165* (2006.01)
*G07C 5/08* (2006.01)

(52) U.S. Cl.
CPC ....... *B60G 17/0165* (2013.01); *G07C 5/0808* (2013.01); *G07C 5/0816* (2013.01); *G07C 5/0841* (2013.01); *B60G 2400/73* (2013.01); *B60G 2400/82* (2013.01); *B60G 2400/8422* (2013.01); *B60G 2500/30* (2013.01); *B60G 2800/01* (2013.01); *B60G 2800/802* (2013.01)

(58) Field of Classification Search
CPC ............ B60G 17/0165; B60G 2500/30; B60G 2800/802; B60G 2400/73; B60G 2400/82; B60G 2400/8422; B60G 2800/01; G07C 5/0808; G07C 5/0816; G04C 5/0841; G01D 21/02; G01M 17/007
See application file for complete search history.

(56) References Cited

U.S. PATENT DOCUMENTS

| 4,396,202 | A | | 8/1983 | Kami et al. |
| 4,923,210 | A | | 5/1990 | Heider et al. |
| 5,322,321 | A | * | 6/1994 | Yopp ...................... B60G 15/08 280/5.514 |
| 6,327,525 | B1 | * | 12/2001 | Pauli ..................... G01M 17/04 280/5.514 |
| 9,428,022 | B2 | * | 8/2016 | Coombs ................. B60G 11/27 |
| 2001/0005803 | A1 | * | 6/2001 | Cochofel ........... B60G 17/0185 701/1 |
| 2008/0203308 | A1 | | 8/2008 | Yoo |
| 2008/0228352 | A1 | * | 9/2008 | Brookes ............. B60G 17/0155 701/37 |

(Continued)

OTHER PUBLICATIONS

Dudar, Aed et al., "Systems and Methods for Coordinating Remote Fuel Delivery to Vehicles," U.S. Appl. No. 15/265,763, filed Sep. 14, 2016, 122 pages.

(Continued)

*Primary Examiner* — Mary Cheung
(74) *Attorney, Agent, or Firm* — Geoffrey Brumbaugh; McCoy Russell LLP

(57) ABSTRACT

Methods and systems are provided for conducting an evaporative emissions test on a fuel system in a vehicle. In one example, in response to a determination, based on the prevailing vehicle and ambient thermal conditions, that altering vehicle height may increase pressure or vacuum build during a pressure or vacuum build phase of an engine off natural vacuum test, employing the vehicle's active suspension to make said height adjustments. In this way the accuracy of engine off natural vacuum testing can be improved, and the conditions under which such testing can be efficaciously conducted increased.

5 Claims, 6 Drawing Sheets

(56) References Cited

U.S. PATENT DOCUMENTS

| | | |
|---|---|---|
| 2009/0002141 A1 | 1/2009 | Rinaldi |
| 2011/0120133 A1 | 5/2011 | Rudrapatna et al. |
| 2017/0137023 A1* | 5/2017 | Anderson ............. B60W 10/22 |
| 2017/0203626 A1* | 7/2017 | Guest ................... B60G 17/017 |

OTHER PUBLICATIONS

Dudar, Aed et al., "Systems and Methods for Coordinating Remote Fuel Delivery to Vehicles," U.S. Appl. No. 15/265,788, filed Sep. 14, 2016, 124 pages.

* cited by examiner

SYSTEM AND METHOD FOR EVAPORATIVE EMISSIONS DETECTION

FIELD

The present description relates generally to methods and systems for controlling a vehicle's active suspension to increase engine-off natural vacuum test robustness.

BACKGROUND/SUMMARY

Vehicle emission control systems may be configured to store fuel vapors from fuel tank refueling and diurnal engine operations, and then purge the stored vapors during a subsequent engine operation. Emission control systems may be intermittently diagnosed, such as for the presence of leaks, so as to reduce the release of fuel vapors to the atmosphere. The presence of an evaporative emissions control system leak may be identified using engine-off natural vacuum (EONV) during conditions when a vehicle engine is not operating. In particular, a fuel system may be isolated at an engine-off event. Pressure build in the sealed fuel system, due to heat rejected from the engine (or other sources), is monitored during an initial pressure phase of the EONV test. Then, as the fuel system cools down, fuel vapors in the fuel tank condense to liquid, creating a vacuum. Vacuum generation in the fuel tank is monitored during a subsequent vacuum phase of the EONV test. The presence of a leak is identified based on actual vacuum development in the vacuum phase relative to a vacuum threshold, as well as actual pressure development in the pressure phase relative to a pressure threshold.

However, there may be issues with the EONV test. As one example, there may be conditions where the EONV test is prematurely aborted. Specifically, the entry conditions and thresholds for the EONV test may be varied based on a total amount of heat rejected into the fuel tank during the prior drive cycle. The total amount of heat rejected may be inferred based on various engine operating conditions such as engine run-time during the previous drive cycle, integrated mass air flow, miles driven, ambient temperature, etc. If sufficient heat is not rejected, it may not be possible to complete the EONV test. As an example, in hybrid electric vehicles (HEVs), including plug-in hybrid electric vehicles (PHEVs), due to the limited engine run time, adequate heat rejection to the fuel tank may not be available for reliable EONV diagnostics.

Additionally, EONV tests may be prone to false failures (wherein a leak is incorrectly identified in a functional fuel system) based on customer driving and parking habits. For example, a refueling event that fills the fuel tank with relatively cool liquid fuel followed by a short vehicle trip may fail to heat the fuel bulk mass. As a result, when the EONV test is run, there may be insufficient pressure/vacuum generation leading to incorrect leak identification. As another example, during mild weather conditions, the lower ambient temperature may restrict the amount of heat rejected to the fuel tank following engine shut-off, limiting the rate of pressure and/or vacuum development. As a result, pressure and/or vacuum may not reach expected thresholds in the time allotted for the EONV test, leading to an incorrect diagnosis of a fuel system leak. This can lead to warranty issues.

Various approaches have been developed to reduce the number of false-fails (that is, erroneous detection of leaks where no leaks are present) and broaden the circumstances under which an EONV test may be initiated and accurately completed (herein also referred to as EONV test robustness). One example approach, shown in US20112120133 by Dudar et al., attempts to increase EONV robustness by employing a cooling fan to increase the rate of fuel system heat dissipation. The approach of Dudar aims to hasten vacuum generation during the vacuum phase of EONV testing, to increase the probability of an accurate test result.

However, the inventors herein have recognized potential issues with such systems. One example limitation of the system of Dudar is that it relies on a significant difference between the fuel system temperature and the ambient air temperature in order to produce cooling and thereby enhance vacuum generation. Under conditions where the temperature difference between bulk fuel and ambient air is not large enough, the cooling fan of Dudar is not able to provide sufficient additional cooling to promote vacuum formation. As a result, even with cooling fan operation, the EONV test may generate false leak identification. Additionally, the cooling fan may not be able to assist in the initial pressure phase of the EONV test where pressure development in a sealed fuel tank is monitored. If the fuel system temperature does not increase sufficiently (for example, owing to limited heat rejection by the engine, cool ambient conditions, etc.) little or no pressure will build within the fuel system and the EONV pressure build phase may incorrectly record the presence of a leak. Operation of the cooling fan of Dudar may be unable to mitigate this issue. As a further example, the need for a dedicated cooling fan can increase component costs.

Thus, the inventors herein have developed systems and methods to at least partially address the above issues. In one example a method for diagnosing fuel system integrity includes adjusting a vehicle suspension height responsive to a fuel system diagnostic test. For example, the vehicle suspension height may be lowered responsive to a pressure build-up phase of the diagnostic test and/or the vehicle suspension height may be raised responsive to a vacuum build-up phase of the diagnostic test. In this way, active suspension system adjustments may be leveraged to improve the robustness of an EONV test.

As one example, responsive to a vehicle-off condition and further responsive to entry conditions for an EONV test being met, environmental and vehicle parameters (e.g., ambient air temperature, ambient humidity, ground temperature, and fuel system temperature) may be assessed to determine if heat transfer into the fuel system during the pressure phase of EONV testing can be increased by lowering vehicle height. In one example, additional heat transfer to the underbody of the vehicle may be possible if the ground temperature where the vehicle is stationed is higher than a threshold, such as due to sun loading on the road. The amount of heat transfer may be further assessed based on the nature of the ground where the vehicle is stationed, such as based on whether the vehicle is parked on concrete, gravel, grass, etc. If additional heat transfer is possible, a vehicle controller may actuate an active suspension system of the vehicle to lower the vehicle towards the ground, thereby decreasing vehicle height prior to conducting the pressure phase of the EONV test. The environmental and vehicle parameters may be further assessed to determine if heat transfer out of the fuel system can be increased during the vacuum phase of EONV testing by raising vehicle height. In one example, additional cooling of the vehicle underbody may be possible if there is an ambient wind condition. If additional fuel system cooling is possible, the vehicle controller may actuate the active suspension system of the vehicle to raise the vehicle further from the ground, thereby increasing the vehicle height prior to conducting the vacuum phase of the EONV test. In further examples, the vehicle controller may assess the environmental conditions within a threshold radius of the vehicle to identify a location where additional heat transfer into and/or out of the fuel system is possible so that the vehicle can be parked in the identified location (e.g., autonomously or via navigation instructions displayed to a vehicle operator) and the EONV test can be conducted with the vehicle at the selected location. For example, a vehicle camera may be used to infer a road surface or ground temperature in the vicinity of the vehicle, and the vehicle may be parked in a location having the highest ground temperature.

In this manner, the robustness of both the pressure and vacuum phases of EONV tests can be improved. The technical effect of lowering vehicle height during a pressure phase of the EONV test is that heat radiation from a hot road surface where a vehicle is parked into a vehicle underbody can be leveraged to increase the rate and amount of pressure build in a fuel system during the pressure phase. In addition, the lowering reduces the cooling effect on the fuel system from underbody air flow or wind. Consequently, the likelihood of false leak detection due to insufficient pressure build-up in the pressure phase is decreased. The technical effect of raising the vehicle height during a vacuum phase of the EONV test is that underbody air flow or ambient wind can be leveraged to increase the rate and amount of vacuum build in the fuel system during the vacuum phase. In addition, the raising reduces the heating effect on the fuel system due to heat radiation from the road surface. By using an active suspension system to vary the vehicle height, EONV robustness is increased using existing engine components, and without requiring dedicated cooling fans. By employing vehicle sensors, such as temperature sensors, cameras, infrared sensors etc., to determine prevailing environmental thermal conditions, and by actuating the active suspension to make vehicle height adjustments based on these thermal conditions, the pressure/vacuum generating temperature shifts within the fuel tank can be enhanced. This enables the pressure and vacuum builds necessary for accurate EONV testing, even in situations where insufficient heat has been rejected by the engine. Overall, EONV testing may be performed over a broader range of thermal and vehicle operating conditions while increasing the accuracy of EONV testing.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
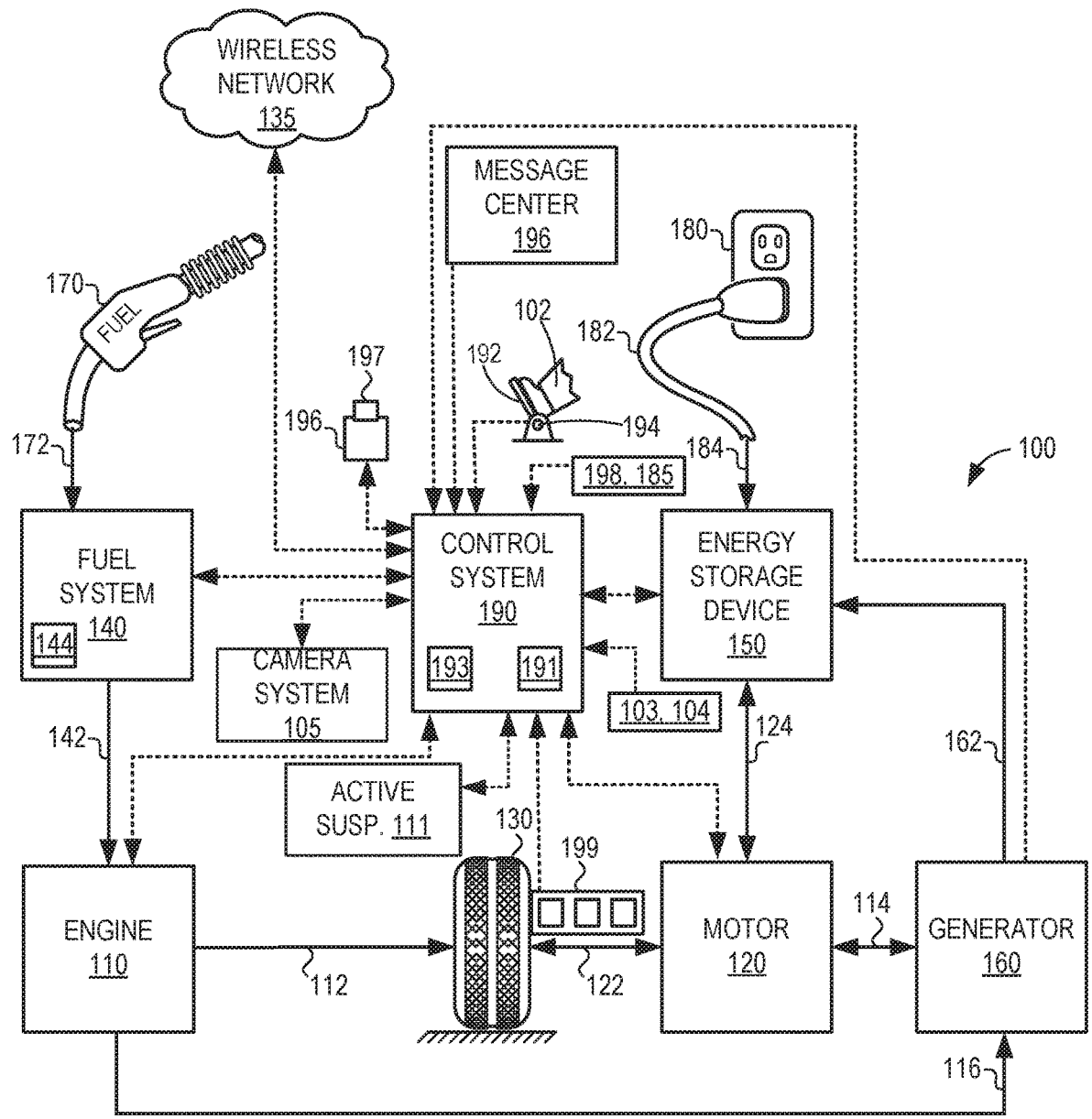
FIG. 1 shows an example vehicle propulsion system.

The following description relates to systems and methods for performing an engine-off natural vacuum (EONV) test in a vehicle comprising an active suspension system, such as the hybrid vehicle system of FIG. 1. Specifically, the description relates to increasing EONV test robustness for an engine evaporative emissions system, such as the system of FIG. 2, by varying vehicle height, via active suspension system adjustments, prior to the pressure and/or vacuum phase of EONV testing dependent on vehicle and environmental thermal conditions. A vehicle controller may be configured to perform a control routine, such as the example routine of FIG. 4, to adjust the vehicle height using the vehicle's active suspension system to increase heat transfer into the fuel system during a pressure phase of the EONV test and/or increase heat transfer out of the fuel system during a vacuum phase of the EONV test. By lowering the vehicle height during the pressure phase and/or raising the vehicle height during the vacuum phase, pressure/vacuum build during the EONV test can be improved, as shown in the example adjustments of FIGS. 3A-3D. The controller may be further configured to assess environmental conditions and select a parking location where EONV test robustness can be enhanced via suspension height adjustments, as shown at FIG. 5. Example vehicle height adjustments and their effect of an EONV test are shown with reference to FIG. 6.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Additionally vehicle control system 190 may communicate with a wireless network 135, such as the internet. In one example, the vehicle control system may include a navigation module which is communicatively coupled to the wireless network. Connection to a wireless network may provide data on weather conditions, road conditions, traffic conditions, wind speeds, and vehicle location, for example. Such data may be stored temporarily or cached in vehicle control system memory for later usage. In one example, the controller may infer a road temperature based on the data received via the wireless network. For example, based on average ambient temperatures, traffic conditions, road location, and nature of material used on the road, the controller may infer a road surface temperature or ground temperature. As an example, the estimated ground temperature may vary based on whether a road (or section thereof) is made of concrete, gravel, or asphalt, whether the road is lined with trees (which can reduce sun loading) or open, whether the road has had a lot of traffic flow (which can increase surface temperatures due to heat transfer from engine exhaust), etc. The ground temperature may be further based on input from one or more vehicle sensors and cameras. As elaborated with reference to FIG. 5, a vehicle controller may select a parking location for the vehicle (within a vicinity of a current location of the vehicle) based on the inferred ground temperature in the vicinity, the selected parking location having a highest ground temperature. As elaborated with reference to FIG. 4, vehicle height adjustments may then be performed based on the ground temperature to increase the robustness of an engine EONV test.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected from the power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, in response to the vehicle operator actuating refueling button 197, a fuel tank in the vehicle may be depressurized so that refueling may be performed.

The vehicle propulsion system 100 may also include a plurality of sensors, such as ambient temperature or humidity sensor(s) 198, wind speed sensor(s) 185, sensors coupled to a camera system 105 (such as where the camera include infra-red sensing capabilities), and sensors dedicated to indicating the occupancy-state of the vehicle, for example seat load cells 103, and door sensing technology 104. The vehicle camera system 105 may include cameras for monitoring the interior and exterior of the vehicle, as well as front and rear of the vehicle, and conditions in the vicinity of the vehicle (such as within a threshold radius of the vehicle body) including road conditions. Examples of road conditions which can be monitored by the camera system include traffic conditions (such as a distance to the bumper of a vehicle ahead or behind the given vehicle), traffic signs or markings along a side of the road (such as a speed limit marker or a railway crossing marker), ground temperature (e.g., road surface or tarmac temperature), surface type of road/tarmac (e.g., blacktop, concrete, asphalt, gravel, etc.), road markings (such as presence and location of lane dividers, parking space designating signs, other road markings, etc.), location of pot-holes, presence of snow or ice on the road, etc. Camera system 105 may possess infra-red, visible light, and ultra-violet imaging capabilities (and corresponding modes of operation). In one example, the infra-red imaging capabilities of camera system 105 may be used for thermal imaging of the environment (in conjunction with the output of the various vehicle sensors) to assess ground temperatures within a threshold radius of the vehicle (such as within 5-10 feet of the vehicle). For example, the temperature of a ground having a blacktop surface can be considerably higher than ambient temperature. The temperature determinations may enable selection of a parking location for reliably conducting an EONV test, such as over the ground region with the highest temperature, as elaborated at FIG. 5.

Vehicle propulsion system 100 may also include inertial sensors 199, such as sensors for estimating longitudinal, latitudinal, and vertical inertia, as well as yaw, roll, and pitch sensors. As one example, inertial sensors 199 may be coupled to a vehicle's restraint control module (RCM) 191 of control system 190. The control system 190 may send a signal to one or more engine torque actuators to adjust engine output and/or wheel brake torque to increase vehicle stability in response to the output of inertial sensors 199. In another example, the control system may adjust an active suspension system 111 responsive to input from inertial sensors 199.

The active suspension system 111 may include a plurality of springs, dampers, shock absorbers, beams, axles, and linkages coupling a body or chassis of the vehicle to the wheels to enable relative motion between the two. The active suspension system may include distinct components coupled to the front wheels (front suspension) versus the rear wheels (rear suspension). Further, the front suspension may have a different degree of constraint versus the rear suspension based on the configuration of the vehicle (such as based on whether the vehicle is a sedan, an SUV, a truck, etc.). One or more components of the active suspension system may be actuated by the vehicle controller to vary the vertical movement of the wheels relative to the chassis or vehicle body, thereby varying the overall vehicle height. For example, a suspension height may be altered to alter the vehicle height. The active suspension system may be actuated via hydraulic, pneumatic, electrical, and/or mechanical devices to control the vehicle height. In one example, the vehicle height is adjusted non-uniformly via suspension height adjustments, such as on an individual corner basis (e.g., where four corners of the vehicle have independently controlled vehicle heights), or on an axle-by-axle basis (e.g., where the vehicle has distinct front axle and rear axle vehicle heights). As another example, the suspension height may be adjusted uniformly to provide a single (uniform) vehicle height for the entire vehicle. In one example, control system 190 may actuate active suspension system 111 to raise the vehicle (and increase vehicle height) for increased ground clearance for off-road events. In another example, control system 190 may actuate active suspension system 111 responsive to vehicle speed to lower the vehicle (and decrease vehicle height) at certain speeds to reduce drag. As another example, the vehicle may be lowered responsive to operator input to improve ease of customer entry/exit into the vehicle, or to load/unload cargo from the vehicle. When adjusted responsive to operator input, the input may be received via an instrument panel cluster, a touchscreen, and/or via physical electrical switches coupled to the vehicle, such as coupled to a dashboard inside the vehicle.

Based on input received from various vehicle sensors, such as such as inertial sensors 199, as well as other input devices, such as input from wireless network 135, the vehicle controller may actuate the active suspension system 111 to lower or raise the vehicle (or a section thereof) relative to a ground surface (such as a road surface).

Control system 190 may receive input data from the various sensors, process the input data, and trigger the various vehicle actuators in response to the processed input data based on instruction or code programmed therein corresponding to one or more routines. An example control routine is described herein with regard to FIGS. 4-5.

Figure 4:
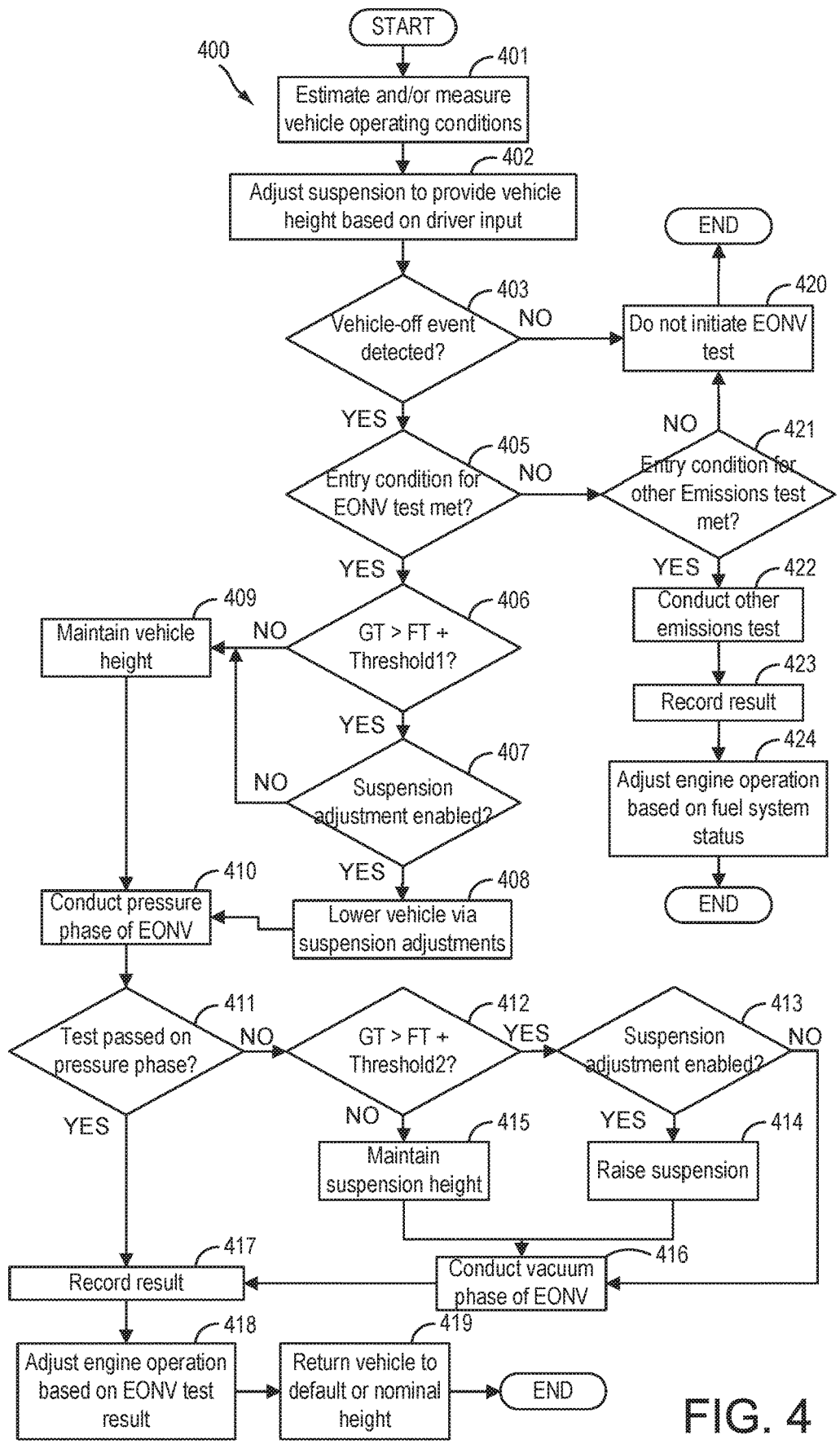
FIG. 4 shows a high level flow chart of an example method for adjusting a vehicle suspension height to increase EONV test robustness.
Figure 5:
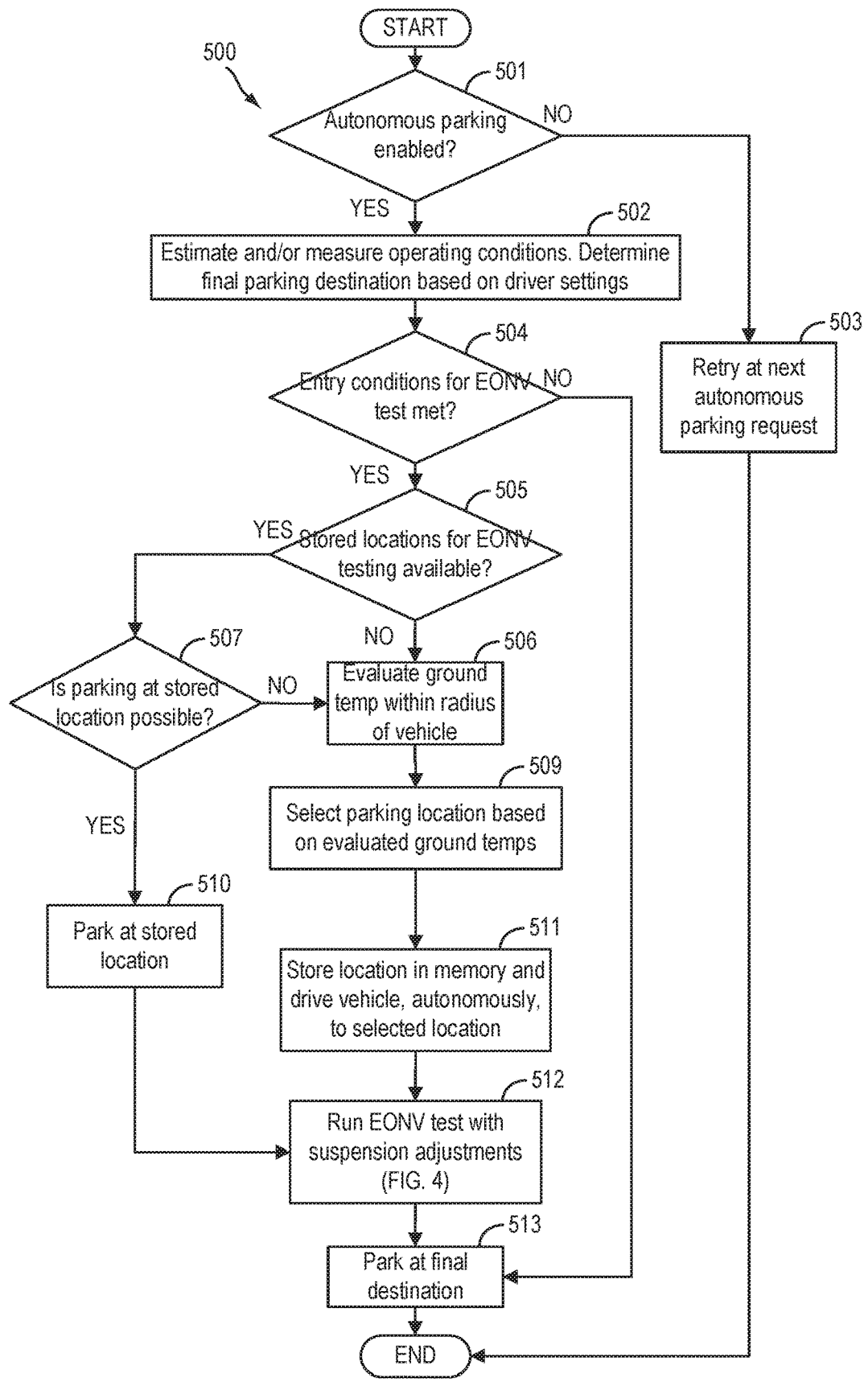
FIG. 5 shows a high level flow chart of an example method for selecting a parking location for conducting EONV testing in a vehicle with autonomous capabilities to increase EONV test robustness.

As elaborated with reference to FIG. 4, active suspension system 111 adjustments may also be employed based at least on ground temperature to adjust a vehicle height prior to the execution of an engine fuel system integrity test, to improve test robustness. In one example, when the ground temperature is greater than a threshold (or when the ground temperature exceeds the fuel system temperature by more than a threshold), the controller may send a signal to an actuator of the active suspension system 111 to actuate the active suspension system 111 to a setting that decreases vehicle height (that is, lowers the vehicle underbody closer to the ground surface) prior to conducting a pressure build phase of EONV testing. In this way, heat radiating from the ground may be used to supplement heat rejection to a fuel tank from the engine. As another example, responsive to the presence of wind conditions, prior to initiating the vacuum build phase of EONV testing, the controller may send a control signal to the actuator of the active suspension system to actuate the active suspension system to increase the vehicle height (that is, raise the vehicle underbody further away from the ground surface). In this way, flow of cool air through the vehicle underbody is enhanced, expediting cooling of the fuel tank during the vacuum build phase.

Figure 2:
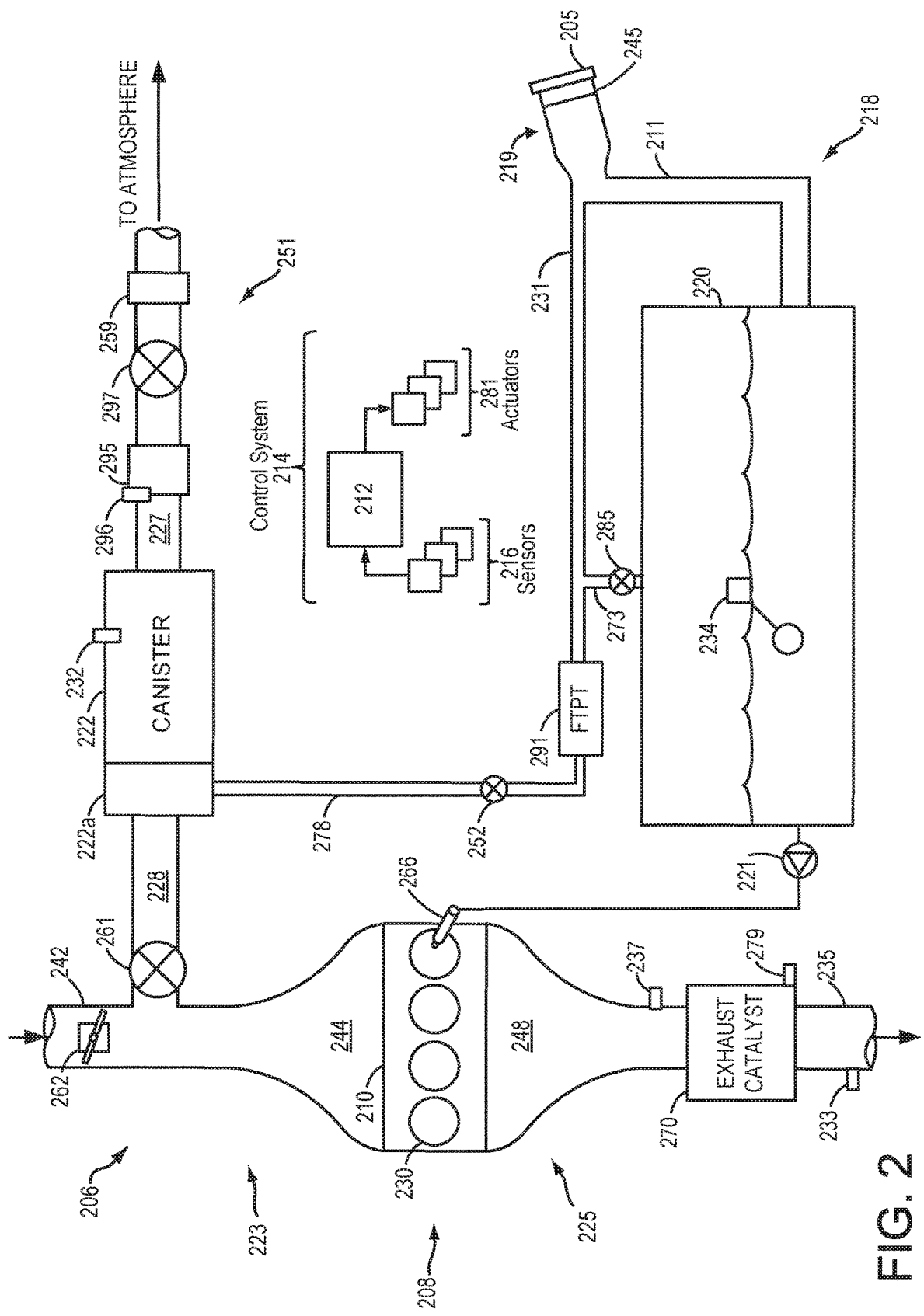
FIG. 2 shows an example fuel evaporative emissions system coupled in the propulsion system of FIG. 1.

FIG. 2 shows a schematic depiction of an engine system 200 having an evaporative emissions system 251 coupled to an engine fuel system 218. In one example, engine system 200 is an example embodiment of engine 110 of FIG. 1, engine fuel system 218 is an example embodiment of fuel system 140 of FIG. 1, and the components of the engine system of FIG. 2 are coupled in hybrid vehicle system 100 of FIG. 1.

The engine system 208 may include an engine 210 having a plurality of cylinders 230. The engine 210 includes an engine intake 223 and an engine exhaust 225. The engine intake 223 includes a throttle 262 fluidically coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more exhaust catalysts 270, which may be mounted in a close-coupled position in the exhaust. Exhaust catalyst may include a temperature sensor 279. In some examples one or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits such as conduit 273.

In some examples, there may be one or more fuel tank vent valves, such as 285, in conduit 273. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example valve 285 in conduit 273 may be a fill limit venting valve (FLVV) 285, or a grade vent valve (GVV). Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent. The canisters are configured to temporarily trap fuel vapors (including vaporized hydrocarbons) during fuel tank refilling operations, "running loss" (that is, fuel vaporized during vehicle operation), and diurnal cycles. In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be the same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve (CVV) 297 coupled within vent line 227. The canister vent valve may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere, or purged to engine intake 223 via canister purge valve 261.

In some configurations, a canister vent valve (CVV) 297 may be coupled within vent line 227. CVV 297 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be a default open valve that is closed upon actuation of the canister vent solenoid. In some examples, CVV 297 may be configured as a latchable solenoid valve. In other words, when the valve is placed in a closed configuration, it latches closed without requiring additional current or voltage. For example, during the conducting of a diagnostic evaporative emissions detection routine, CVV 297 may be placed in a closed configuration to isolate emissions control system 251 from the atmosphere, with CPV 261 maintained closed. In another example, closing CVV 297 and opening isolation valve 252 during a diagnostic evaporative emissions detection routine may couple the fuel system 218 and emissions control system 251, wherein the coupled fuel system 218 and emissions control system 251 are isolated from atmosphere, with CPV 261 maintained closed.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 while closing isolation valve 252. Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291 (fuel tank pressure transducer), and canister temperature sensor 232. Other sensors such as pressure, temperature, air/fuel ratio, and composition sensors may be coupled to various locations in the vehicle system 206. As another example, the actuators may include fuel injector 266, throttle 262, fuel tank isolation valve 252, CVV 297, CPV 261 and refueling lock 245. The controller 212 may receive input data from the various sensors, process the input data, and trigger the actuators in response to the processed input data based on instruction or code programmed therein corresponding to one or more routines. An example control routine is described herein with regard to FIG. 4.

Evaporative emissions detection routines (or integrity tests) may be intermittently performed by controller 212 on fuel system 218 and emissions control system 251 to confirm that the fuel system 218 and/or emissions control system 251 is not degraded and there are no leaks in the system. In one example, integrity tests may be performed to monitor for leaks that are 0.02" or larger. Evaporative emissions detection routines may be performed while the engine is off (engine-off natural vacuum or EONV test) using the natural pressure changes induced by changing fuel temperatures within the sealed fuel system 218. The EONV test relies on heat rejection from the hot engine to reach the tank and warm the bulk fuel. Briefly, EONV tests are conducted while the engine is off and the vehicle is stationary. At key-off, the vehicle controller (e.g., a powertrain control module) stays alive and seals the fuel system 218 from the atmosphere by closing CVV 297 and CPV 261 (such as by de-energizing the solenoids coupled to the corresponding valves). Then, with the fuel system sealed, the controller initially monitors a rate and amount of positive pressure build up within the sealed system via FTPT 291. After closing CVV 297 and CPV 261, heat rejected by the engine and exhaust system into the sealed fuel system may cause a pressure build (herein also referred to as the pressure build phase or pressure phase of the EONV test). Additional sources of heat may include ambient air and heat radiation from the ground. If the pressure build-up within the sealed fuel system surpasses a predetermined threshold, or rises at higher than a predetermined threshold rate, then a determination that no leaks exist within the fuel system 218 is made. For example, if sufficient heat was rejected into the fuel tank and the ambient temperature is warm, the pressure build may be sufficient for a pass result to be outcome. However, if the pressure build during this phase plateaus prior to reaching the predetermined threshold, or if the pressure rises at less than the threshold rate, it may be inferred that a fuel system leak may be present, and the test will continue on to conduct a vacuum build phase. Before initiating the vacuum build phase, CVV 297 is opened to vent the pressure in the sealed fuel system, allowing the pressure within the fuel system 218 to equilibrate with atmospheric pressure. CVV 297 is then closed a second time and generation of a vacuum within the system is monitored via FTPT 291. As the fuel system 218 cools due to the engine being shut down and no further cylinder combustion occurring, the pressure in the fuel system may start to decrease. If the vacuum build-up within the sealed fuel system surpasses a predetermined threshold, or rises at higher than a predetermined threshold rate, then a determination that no leaks exist within the fuel system 218 is made. For example, if moderate heat was rejected into the fuel tank and the ambient temperature is mild or cool, the vacuum build may be sufficient for a pass result to be outcome. However, if the vacuum build during this phase plateaus prior to reaching the predetermined threshold, or if the vacuum rises at less than the threshold rate, it may be inferred that a fuel system leak may be present. As such, the EONV test can pass either on a pressure build phase or a vacuum build phase. Upon Completion of the vacuum phase of EONV testing, CVV 297 is opened to vent the fuel system, and the test is deemed completed.

In addition to the test results, the EONV test also a completion frequency requirement (also called in use monitoring performance or IUMP). In one example, the completion frequency requirement is 52%. That is, roughly half the drive cycles have to run the EONV test at key-off. If the completion frequency is not met, a diagnostic code may be set.

Evaporative emissions tests can also be conducted using a pressure or vacuum pump to pressurize the canister in place of naturally occurring pressure/vacuum builds, however, this approach may be more energy intensive and requires additional components. Evaporative emissions detection routines may also be performed while the engine is running (engine-on evaporative emissions tests) by applying the engine intake manifold vacuum on the fuel system.

Evaporative emissions tests may be performed by an evaporative level check module (ELCM) 295 communicatively coupled to controller 212. ELCM 295 may be coupled in vent 227, between canister 222 and the atmosphere. ELCM 295 may include a vacuum pump for actively applying negative pressure to the fuel system and/or emissions control system when administering an evaporative emissions test. In some embodiments, the vacuum pump may be configured to be reversible. In other words, the vacuum pump may be configured to apply either a negative pressure or a positive pressure on the fuel system and/or emissions control system. ELCM 295 may further include a reference orifice and a pressure sensor 296. Following the application of vacuum to the fuel system and/or emissions control system, a change in pressure at the reference orifice (e.g., an extent of change or a rate of change) may be monitored and compared to a threshold. Based on the comparison, a fuel system and/or emissions control system integrity may be diagnosed. In one example, the ELCM 295 is used for conducting non-EONV evaporative emissions testing.

As described above, EONV tests rely on heat absorption by the fuel system 218 during the pressure build phase, and on heat dissipation from the fuel system during the vacuum phase. This makes the EONV test prone to error due to human interaction and environmental factors. For example, an EONV run during summer weather can result in a robust pressure build within a couple of minutes due to heat radiation from the hot road and sun loading supplementing the heat rejection from the engine and underbody. However, in moderate weather, if it is windy or mild, the wind may counteract the pressure rise and a scenario may arise where there is equilibrium between heat generation and wind cooling resulting in a false positive call (e.g., where a leak is incorrectly determined). Likewise, in situations where heat absorption by the fuel system 218 during the pressure phase and heat dissipation by the fuel system during the vacuum phase is low, insufficient pressure or vacuum build can occur, resulting in a false failure of an EONV test (that is, incorrect determination that leaks are present when fuel system is not degraded) which may lead to unnecessary vehicle repairs, service, and related warranty issues. For example, if the EONV test is conducted after a short duration of engine operation, such as after a short trip, or in hybrid vehicles where engine operation is only a fraction of total drive time, the heat rejection by the engine to the fuel tank is insufficient to elevate fuel temperatures substantially above ambient temperature. This may results in a small and/or slow pressure increase within the sealed fuel system 218 when the EONV test is conducted. The small and/or slow pressure increase may result in a leak being inferred during the pressure phase of the EONV test. Additionally, wind induced cooling of the fuel tank during EONV pressure build testing can offset heat absorption from other sources, thereby reducing the amount of pressure build. Insufficient heat absorption by the fuel system 218 during the pressure phase is an issue which can carry over into the vacuum phase as well. This is because the higher the temperature of the fuel system 218 when starting the vacuum phase, the more readily heat will flow out of these systems leading to a heat dissipation induced vacuum build. Thus, when the temperature at the onset of vacuum phase is low (e.g., near ambient), sufficient temperature reduction via heat dissipation is unlikely, and subsequently, a small and/or slow vacuum increase within the sealed fuel system 218 may occur when the EONV test is conducted. Additionally, the accuracy of the vacuum build phase may be impaired in situations where fuel system cooling is reduced by the proximity of heat radiating external sources (e.g., hot ground surface). As elaborated with reference to FIG. 4, these issues may be addressed by adjusting a vehicle height via active suspension adjustments during an EONV test based on ground temperature, fuel system temperature, and ambient temperature. Therein, vehicle lowering can be used to enable engine, exhaust, and ground (or tarmac) heat rejection to influence the pressure build phase without corrupting the results due to a cooling effect from underbody air or wind flow. Conversely, if the pressure phase stalls out (e.g., zero slope) and a vacuum phase is conducted, vehicle raising can be used to enable a cooling airflow or wind to influence EONV vacuum generation to accelerate the time it takes to reach a vacuum threshold and pass the monitor.

Figure 3A:
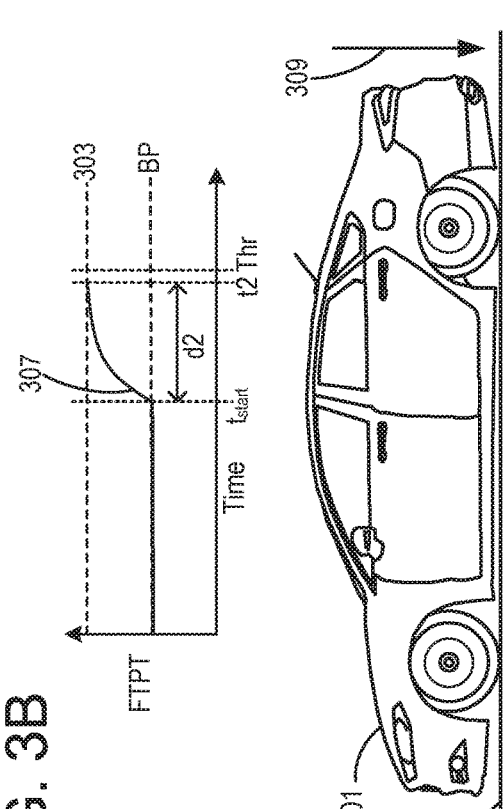
FIG. 3A shows an example pressure phase of EONV testing without active suspension adjustments.
Figure 3B:
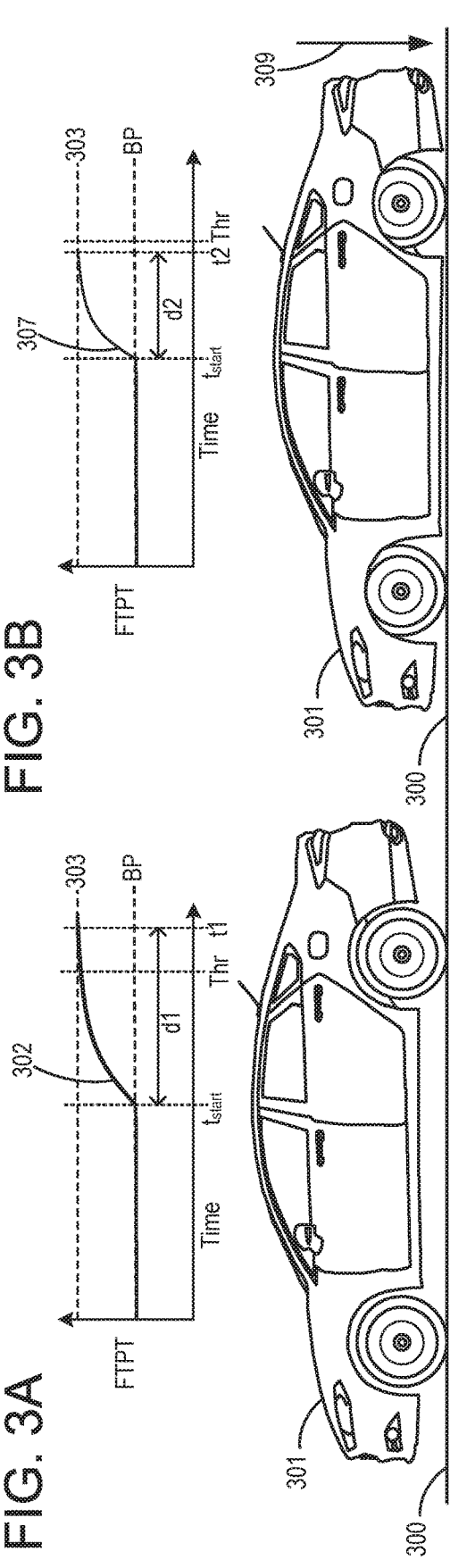
FIG. 3B shows an example pressure phase of EONV testing with active suspension adjustments.
Figure 3C:
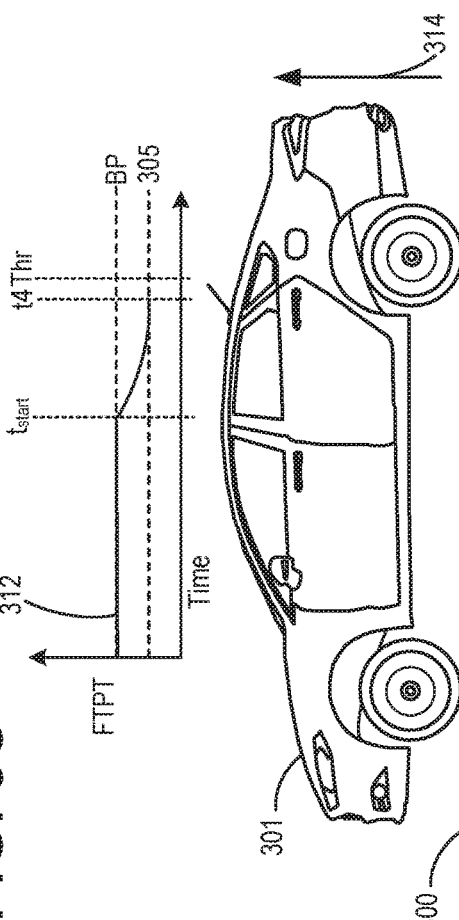
FIG. 3C shows an example vacuum phase of EONV testing without active suspension adjustments.
Figure 3D:
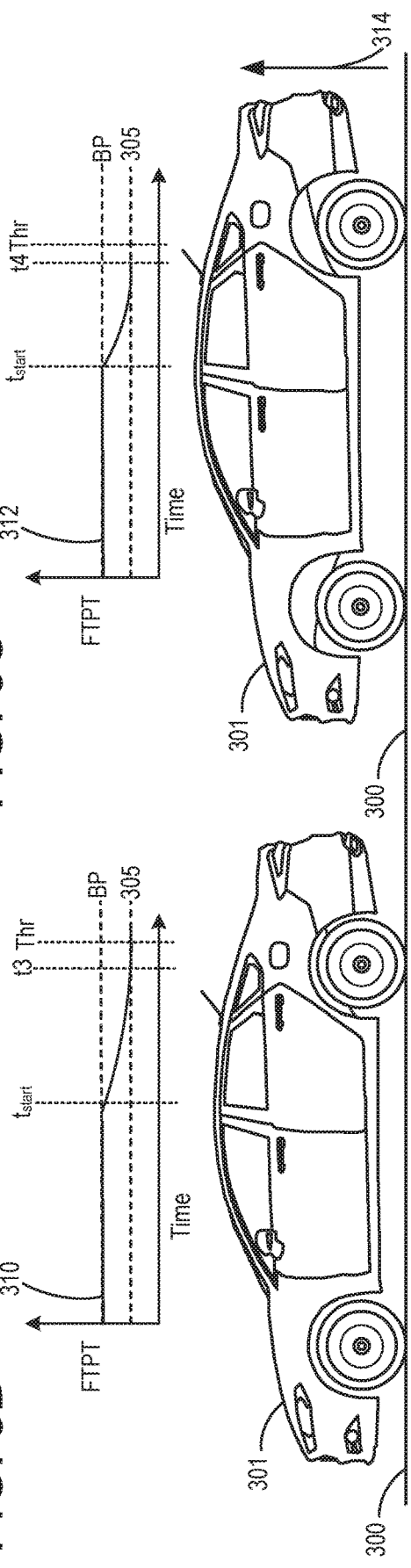
FIG. 3D shows an example vacuum phase of EONV testing with active suspension adjustments.

FIGS. 3A-3D illustrate example vehicle height adjustments that can be employed to improve EONV test robustness. In each of the examples of FIGS. 3A-3D, a vehicle 301 is parked with the engine not running, and with EONV test conditions met. The examples of FIGS. 3A and 3B compare a pressure phase of the EONV test with (FIG. 3B) and without (FIG. 3A) vehicle height adjustments. The examples of FIGS. 3C and 3D compare a vacuum phase of the EONV test with (FIG. 3D) and without (FIG. 3C) vehicle height adjustments. In each of the depicted examples, a temperature of the ground 300 on which vehicle 301 is parked is significantly higher than that of the ambient air and of the vehicle's fuel system.

In FIG. 3A, a pressure build phase of an EONV test in vehicle 301 is shown with no vehicle height adjustments. In particular, the vehicle's active suspension system remains at a default position when the vehicle is parked with the engine off. The fuel system is initially at barometric pressure (BP). When the fuel system is sealed to start the pressure phase of the EONV test (at $t_{start}$), a positive pressure starts to build in the fuel system, as monitored by the fuel tank pressure transducer (FTPT). The pressure follows a pressure build trajectory 302 and rises from BP, reaching the pressure build threshold 303 at t1, after a duration d1 since the starting of the test. Herein, the pressure build trajectory is a shallow trajectory. Even though the pressure build threshold 303 is reached, due to the time taken (d1) to reach the pressure threshold exceeding a time threshold Thr, the EONV test is not passed. In one example, the time threshold Thr is 35 minutes.

FIG. 3B illustrates the pressure build phase of an EONV test in vehicle 301 with vehicle height adjustment. Herein, a vehicle controller leverages heat radiation from ground 300 to improve the pressure build trajectory. In particular, active suspension adjustments are used to lower a height of the entire vehicle (as shown by arrow 309) from the default height towards ground 300 so that more heat can be radiated from the hot ground surface to the fuel system in the underbody area of the vehicle. In addition, cooling air flow across the underbody area is reduced be lowering the vehicle 301 closer to ground 300. The fuel system is initially at barometric pressure (BP). When the fuel system is sealed to start the pressure phase of the EONV test (at $t_{start}$), a positive pressure starts to build in the fuel system, as monitored by the fuel tank pressure transducer (FTPT). The pressure follows a pressure build trajectory 307 and rises from BP, reaching the pressure build threshold 303 at t2, after a duration d2, shorter than duration d1 since the starting of the test. Herein, the pressure build trajectory 307 is a steeper trajectory than pressure build trajectory 302 and enables the test to be completed earlier. Due to the time taken (d2) to reach the pressure threshold being within time threshold Thr, the EONV test is passed.

In FIG. 3C, a vacuum build phase of an EONV test in vehicle 301 is shown with no vehicle height adjustments. In particular, the vehicle's active suspension system remains at a default position when the vehicle is parked with the engine off. The fuel system is initially at barometric pressure (BP). When the fuel system is sealed to start the vacuum phase of the EONV test (at $t_{start}$), a negative pressure (or vacuum) starts to build in the fuel system, as monitored by the fuel tank pressure transducer (FTPT). The pressure follows a vacuum build trajectory 310 and falls from BP, reaching the vacuum build threshold 305 at t3, after a duration d3 since the starting of the test. Herein, the vacuum build trajectory is a shallow trajectory. Even though the vacuum build threshold 305 is reached, due to the time taken (d3) to reach the vacuum threshold exceeding a time threshold Thr, the EONV test is not passed.

FIG. 3D illustrates the vacuum build phase of an EONV test in vehicle 301 with vehicle height adjustment. Herein, a vehicle controller improves cooling air flow over the underbody area of the vehicle 301, and additional heat rejection from the fuel system to the ground 300, to improve the vacuum build trajectory. In particular, active suspension adjustments are used to raise a height of the entire vehicle (as shown by arrow 314) from the default height, away from ground 300, so that more cool air and wind can flow over the underbody area of the vehicle, and more heat can be rejected from underbody area of the vehicle. In addition, less heat can be radiated from the hot surface of ground 300 to the fuel system. The fuel system is initially at barometric pressure (BP). When the fuel system is sealed to start the vacuum phase of the EONV test (at $t_{start}$), a negative pressure starts to build in the fuel system, as monitored by the fuel tank pressure transducer (FTPT). The pressure follows a pressure build trajectory 312 and falls from BP, reaching the vacuum build threshold 305 at t4, after a duration d4, shorter than duration d3 since the starting of the test. Herein, the vacuum build trajectory 312 is a steeper trajectory than vacuum build trajectory 310 and enables the test to be completed earlier. Due to the time taken (d4) to reach the vacuum threshold being within time threshold Thr, the EONV test is passed.

In this way, by leveraging suspension height adjustments to expedite pressure or vacuum build during the corresponding phases of an EONV test, not only is the robustness of the test enhanced, but also, evaporative emission testing opportunities are increased even after limited engine operation times. This improves the completion frequency of the EONV test. As a result, fuel system degradation can be identified earlier and reliably, and addressed in a timely manner. By increasing the accuracy of leak determination, warranty issues associated with frequent false positive leak determinations can be reduced.

Turning to FIG. 4, an example method 400 for adjusting vehicle suspension height prior to the pressure and/or vacuum build phase of an EONV test is shown. Method 400 enables enhanced EONV pressure build or vacuum build by adjusting vehicle suspension height. Method 400 will be described with reference to the systems described herein and shown in FIGS. 1-2, though it should be understood that similar methods may be applied to other systems without departing from the scope of this disclosure. Instructions for carrying out method 400 and the rest of the methods included herein may be executed by a controller, such as the control system of FIGS. 1-2, based on instructions stored in non-transitory memory and in conjunction with signals received from sensors of the engine system, such as the camera system, temperature sensors, and other sensors described in FIGS. 1-2. The controller may employ actuators of the engine and fuel system to adjust engine operation, according to the methods described below.

Method 400 begins at 401 and includes evaluating current vehicle and engine operating conditions. Operating conditions may be estimated, measured, and/or inferred, and may include one or more vehicle conditions, such as vehicle speed, vehicle location, etc., various engine conditions, such as engine status (on or off), engine load, engine speed, exhaust air-fuel ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

At 402, the vehicle suspension height is adjusted based on a driver selected drive mode and/or vehicle driving conditions. In one example, the vehicle suspension is adjusted to a default setting to provide a default vehicle height. Driver selected drive modes may be based on a desired level of vehicle performance. For example, the driver may select a sport mode (such as where vehicle responsiveness and handling is optimized for aggressive driving situations including small response times and higher boost levels). As another example, the driver may select an economy mode (such as where vehicle responsiveness and handling is optimized for maximum fuel efficiency). Still other drive modes may be based on a desired ride feel such as "stiff", "soft", or "medium". As an example, the vehicles active suspension may be actuated to reduce the vehicle height from the default height, by lowering the vehicle closer towards the ground, responsive to the drive selecting a "sport" mode. By lowering the vehicle during the sport mode, vehicle drag is reduced by decreasing undercarriage air flow. In addition, the vehicle's center of gravity is lowered for improved handling around corners. In further examples, the vehicle suspension height may be adjusted from the default setting upon attainment of a threshold vehicle speed for improved performance at or above that vehicle speed. In still another example, the active suspension system may be actuated to increase vehicle height for increased ground clearance for off-road events. In still further examples, the vehicle height may be decreased responsive to operator input to improve ease of customer entry/exit into the vehicle, or to load/unload cargo from the vehicle.

At 403, method 400 includes determining whether a vehicle-off event has occurred. The vehicle-off event may include an engine-off event, and may be indicated by other events, such as a key-off event, depression of a start-stop button, removal of a passive key from the vehicle, etc. The vehicle-off event may follow a vehicle run time duration, the vehicle run time duration commencing at a previous vehicle-on event. If no vehicle-off event is detected, method 400 proceeds to 420 where an EONV test is not initiated due to entry conditions for the test not being met. The controller may continue to monitor vehicle conditions and delay initiation of an EONV test until after a vehicle-off event is confirmed. Method 400 then ends.

If a vehicle-off event is confirmed, method 400 may proceed to 405 where it is determined if all entry conditions for conducting an EONV test are met. In addition to requiring a vehicle-off event, entry conditions for the EONV test may include, for example, a threshold distance having been traveled or threshold time having elapsed since the last iteration of an EONV test. These distances and/or times may correspond to set intervals, or they may be actively adjusted according to the results of previous EONV tests. For example, if the previous EONV test indicated the presence of leaks, then additional testing at the next vehicle-off event may be performed to confirm this result. Further, EONV test scheduling may be based on parameters obtained during the previous EONV test, such as the duration of time required for a pressure/vacuum build to pass a given threshold or the extent to which a pressure/vacuum build was above or below a predetermined threshold on the last EONV test. As an example, if the time required for a pressure or vacuum build to surpass a predetermined threshold is longer than a threshold time, this may indicate the need for more frequent EONV tests to ensure the fuel system is free of leaks, and as such the distance/time until the next EONV test may be reduced.

As another example, entry conditions for EONV testing may include a temperature of one or more vehicle components being above corresponding predetermined temperature thresholds. For example, an engine temperature below a predetermined threshold may indicate insufficient heat rejection into the fuel system to obtain accurate EONV test results. Additionally, EONV entry may depend on an inferred amount of heat rejected by the engine during the previous drive cycle. The amount of heat rejected by the engine into the fuel system may be inferred based on the length of time spent at differing engine speeds and load, vehicle speeds, frequency of operator accelerator and brake pedal application, differing levels of drive aggressiveness (e.g., duration of total drive cycle time spent in sport mode versus fuel economy mode), fuel system temperature, total fuel injected since the previous vehicle-off event, total mass of intake manifold air since the previous vehicle-off event, etc. Further, entry conditions may be based on ambient temperature, ground temperature, and fuel system temperature. The ambient, fuel system, and ground temperatures may be estimated, inferred, and/or measured via temperature sensors, cameras (including infrared cameras and sensors) or retrieved from an off-board weather server via wireless connection, etc. As another example, a fuel tank temperature below a predetermined threshold may indicate an insufficient fuel vaporization rate to induce a reliable pressure build. However, in other examples, EONV testing may occur at any temperature.

As another example, entry conditions for EONV testing may include determining if a refueling event is taking place. For example, EONV testing may not be performed while the fuel tank is being refilled or when the fuel cap is off.

As another example, entry conditions for EONV testing may include an amount of available energy stored in an energy storage device, such as a battery, being higher than a threshold. The threshold state of charge (SOC) of the battery required may be adjusted to enable the controller to operate the active suspension system, vacuum or pressure pumps, or other energy consuming devices required for conducting the EONV test. As an example, if the state of charge of the battery is insufficient to operate the active suspension system, the test may not be entered into, or alternatively the duration of the test may be shortened to accommodate the limited available energy in the battery.

Further, EONV test entry conditions may include a threshold amount of fuel being in the fuel tank, below which it may be determined that insufficient fuel vapor generation may occur. The fuel level threshold may be determined as a function of fuel system temperature, such that at a given fuel system temperature there exists a requisite fuel level below which EONV test results may be inaccurate. Fuel level may be determined by a fuel level sensor, such as fuel level sensor 234 depicted in FIG. 2.

As another example, entry conditions for EONV testing may include an indication that the vehicle is not occupied. For example, the indication that the vehicle is not occupied may include one or more of a powertrain control module query of seat load cells (e.g., seat load cells 103 in FIG. 1), door sensing technology (e.g., door sensor 104 in FIG. 1), onboard cameras (e.g., camera 105 in FIG. 1), etc. In some examples, commencing the EONV test may be subsequent to an indication that the vehicle is not occupied.

If any or all of the EONV test entry conditions are not met, method 400 may proceed to 421 where method 400 may include evaluating entry conditions for evaporative emissions tests other than EONV based tests, such as fuel system integrity tests involving active pressurization or depressurization of the fuel system. In one example, active pressurization/depressurization evaporative emissions tests may have entry conditions that are less stringent than those of the EONV test, enabling such tests to be conducted more frequently.

As an example, after a short duration of vehicle engine operation, entry conditions for an EONV test may not have been met owing to an insufficient amount of heat generation by the engine. However, under such conditions, an active pressurization/depressurization method may still be employed. If entry conditions for non-EONV based evaporative emissions testing are met, method 400 proceeds to 422. If neither the entry conditions for EONV nor non-EONV testing are met, then method 400 moves to 420 which includes not initiating an EONV test, recording that an evaporative emissions test was not executed on the current vehicle-off event, and may further include setting a flag to retry the evaporative emissions test at the next detected vehicle-off event. Method 400 may then end.

If non-EONV test entry conditions are met, at 422 method 400 employs non-EONV evaporative emissions testing to determine fuel system integrity. Such tests may include operating a pump, such as a pressure or vacuum pump to actively increase or decrease a pressure within the sealed fuel system, spinning the engine unfueled, and monitoring one or more of a rate of pressure increase/decrease, a threshold of pressure/vacuum build being reached, or the ability of the fuel system to maintain a pressurized or depressurized state over a predetermined duration of time. After conducting such a test, method 400 proceeds to 423.

At 423, method 400 records the result of the non-EONV evaporative emissions test. For example, recording the outcome of the test may include recording a passing result of the evaporative emissions test at the controller, or recording a failing result of the evaporative emissions test at the controller. Responsive to a failing result of the evaporative emissions test, at 423, recording the result may include setting a flag or diagnostic code at the controller, and activating a malfunction indicator light (MIL) to inform the vehicle operator of fuel system degradation. Once the result of the test is recorded method 400 proceeds to 424.

Subsequent to the conducting of an evaporative emissions test procedure at 422 and recording the result at the controller, method 400 may proceed to 424. At 424, method 400 may include adjusting engine operation (including adjusting the schedule and operation of the evaporation emissions system and fuel system) based on the result of the evaporative emissions test. For example, responsive to a passing result from the conducted evaporative emissions test wherein fuel system degradation is not indicated, an evaporative emissions test schedule (for subsequent tests) may be updated. As an example, responsive to a passing test result, scheduling of a subsequent evaporative emissions test may be delayed, or a frequency of emission test scheduling may be decreased. Alternatively, responsive to a failing evaporative emissions test result, scheduling of a subsequent evaporative emissions test may be expedited, or a frequency of emission test scheduling may be increased. Still other engine operating parameters may be adjusted. For example, responsive to an indication of evaporative emissions system or fuel system degradation (e.g., presence of a leak), a maximum engine load permitted during subsequent engine operation may be limited to reduce fuel consumption, cylinder enrichment may be limited, and/or use of motor torque for vehicle propulsion (relative to engine torque) may be increased. Method 400 may then end.

In the case that entry conditions for EONV testing are met at 405, method 400 may then proceed to 406. At 406, method 400 includes determining a fuel system temperature (abbreviated FT), ambient temperature, and ground temperature (abbreviated GT). These temperature determinations can be based directly on sensor readings (such as estimating the FT based on the output of a temperature sensor coupled to the fuel tank or estimating the ambient temperature based on the output of an intake air temperature sensor), inferred based on sensor readings (such as estimating the ground temperature based on the output of an exhaust temperature sensor and an intake air temperature sensor), estimated based on models, or estimated via data obtained from a wireless network or via one or more on-board devices such as a camera (such as estimating the ground temperature based on ambient temperature, sun loading, and wind conditions). In one example, the controller may further infer the ground temperature based on the nature of the surface, such as based on whether the ground is covered with concrete (such as in a parking garage) or with asphalt (such as on a road). Since asphalts and blacktops retain more heat from sun loading than concrete, for example, the controller may use a first transfer function with a lower gain to infer the ground temperature from ambient air temperature when the ground surface includes concrete while using a second transfer function with a higher gain to infer the ground temperature from ambient air temperature when the ground surface includes asphalt or blacktop. In another example, prior to vehicle key-off, the controller may use an on-board sensor (such as a rear camera of the vehicle operating in an infra-red mode) to image the ground surface and infer or approximate a ground surface temperature based on the imaging. Once temperature values are determined, at 406, the controller evaluates whether the ground temperature exceeds the fuel system temperature by more than a first threshold (threshold1). Alternatively, it may be determined if the ground temperature is higher than a threshold temperature. The threshold temperature or temperature difference (Threshold1) may reflect a condition where heat rejection from the engine to the fuel system can be supplemented with heat radiating from the ground surface. In particular, when ground temperature exceeds the ambient temperature by more than the threshold, there is an opportunity to gain additional heat from the ground radiant heat and pass an EONV test quickly on the pressure build phase of the test. The threshold may be based on a variety of vehicle and environmental factors such as fuel system temperature, wind speed, weather conditions, ground temperature, etc., such that if the difference between ground temperature and fuel system temperature is larger than threshold1, additional fuel system heating is anticipated upon lowering of the vehicle towards the ground (that is, a decrease in vehicle height). If the ground temperature is not greater than the threshold, or does not exceed the fuel system temperature by more than threshold1, then method 400 proceeds to 409 where the controller maintains the suspension settings and vehicle height at the default height, or the nominal height selected at 402 based on driver input.

If the ground temperature is greater than the threshold, or exceeds fuel system temperature by more than threshold1, method 400 proceeds to 407 where it is confirmed if suspension adjustments are enabled. Suspension adjustments may be determined to be enabled if there is no indication of vehicle active suspension system degradation (such as when no flags or diagnostic codes associated with the active suspension system are set). Additionally, suspension adjustments may be enabled when lowering the vehicle is not expected to result in the undercarriage of the vehicle colliding with the ground surface or ground features. As another example, suspension adjustments may be enabled upon confirming that the vehicle is not occupied. If a vehicle occupant is detected, such as based on the output of a seat load cell, active suspension adjustments may not be enabled. In the event that suspension adjustments are not enabled, method 400 moves to 409 to maintain vehicle suspension settings and maintain vehicle height at the user specified default or nominal height. If suspension adjustments are enabled, method 400 proceeds to 408 to schedule the EONV test and adjust a vehicle suspension height responsive to the scheduling of the fuel system diagnostic test.

Since the pressure phase of an EONV test is initiated first, at 408, method 400 includes lowering the vehicle suspension height responsive to the upcoming pressure build-up phase of the diagnostic test. By lowering the active vehicle suspension, the vehicle height is decreased. In one example, the lowering of the suspension height is proportional to the ground temperature, or the difference between the ground temperature and the fuel system temperature, so as to increase the amount of ground heat radiation transferred to the fuel system. In one example, the vehicle is lowered further towards the ground as the ground temperature increases or the difference between the ground temperature and the fuel system temperature increases. Herein, the suspension height may be decreased uniformly to lower the vehicle height at each wheel to the same extent. In other examples, the lowering includes lowering the vehicle height by lowering the suspension height to a maximum extent, thus bringing vehicle height to the minimum height achievable. Herein the vehicle is lowered as low as possible to the ground surface without damaging the vehicle underbody. In still further examples, active suspension vehicle lowering may occur differentially or non-uniformly at one or more wheels (e.g., different at front wheels versus rear wheels) such that there may be a distinct extent of lowering at each wheel of the vehicle. Therein, the vehicle may be lowered such that the section of the underbody closest to the fuel tank is lowered furthest towards the ground surface as compared to other sections of the underbody. Upon completion of active suspension lowering at 408, method 400 proceeds to conduct a pressure build phase of EONV testing at 410. Even if suspension adjustments are not made and the vehicle is at the default or nominal height (as at 409), the method moves to 410 to conduct the pressure phase of the EONV test.

At 410, a pressure build phase of EONV test may be conducted. Therein the fuel system may be sealed from the atmosphere. This includes the controller sending a control signal to a canister vent solenoid to actuate a CVV closed (e.g., CVV 297 in FIG. 2), sending a control signal to a canister purge solenoid to actuate a CPV closed (e.g., CPV 261 in FIG. 2), sending a control signal to actuate an FTIV open (e.g., fuel tank isolation valve 252 in FIG. 2) in order to seal the fuel system. Subsequent to isolating the fuel system from the atmosphere, a pressure build in the fuel system may be monitored for a duration. For example, if sufficient total heat was rejected to the fuel tank from engine and exhaust heat generated during the previous drive cycle, heat rejected from ambient air, and supplemental heat radiated to the fuel tank from the ground surface upon lowering of the vehicle (such as when suspension height adjustments were performed), pressure in the fuel system may increase as liquid fuel vaporizes. Heat rejection from the ground enhances the heat absorbed by the fuel tank, causing the rate and extent of pressure build within the sealed fuel system to increase. The extent of heat transfer between the ground and the fuel tank increases as a distance between them decreases. Thus, in cases where ground/fuel system separation distance has been reduced via active suspension adjustments, and when the ground temperature is greater than a threshold (threshold1) higher than the fuel system temperature, a more robust pressure build may occur. If the pressure builds to a predetermined threshold level within the allotted test time, rises at or above a threshold rate, or follows an expected pressure build trajectory, the evaporative emissions test may pass on the pressure build phase. However, if the pressure increase plateaus prior to reaching the predetermined pressure threshold, rises below the threshold rate, or does not follow the expected pressure build trajectory, the test may be deemed failed, indicating a degraded fuel system (e.g. a fuel system with leaks present). In either case once the pressure build phase has concluded, the fuel system is vented. This includes the CVV being commanded open, to enable the pressure within the fuel system to return to atmospheric levels. Method 400 then proceeds to 411. In other examples, once the pressure phase is passed, the EONV test is considered passed and the test does not move forward to the vacuum phase.

At 411, method 400 confirms whether the EONV pressure build phase was passed. If the test was passed, such as when a threshold rate and/or extent of pressure build was achieved during the test, method 400 proceeds directly to 417, else method 400 proceeds to 412.

At 412, method 400 includes retrieving the fuel system temperature, ambient temperature, and ground temperature and evaluating whether the ground temperature exceeds the fuel system temperature by more than a second threshold (threshold2), different from the first threshold. In one example, the second threshold is smaller than the first threshold. Alternatively, it may be determined if the ground temperature is higher than another threshold temperature. Further still, it may be determined if wind conditions are present, or if wind flow is higher than a threshold speed. The threshold temperature, threshold speed of wind flow, or temperature difference (Threshold2) may reflect a condition where heat rejection from the fuel system to the ambient air can be enhanced with improved air flow through the vehicle underbody. In particular, when ground temperature exceeds the fuel system temperature by more than the threshold, there is an opportunity to lose additional heat from the fuel system and pass an EONV test quickly on the vacuum build phase of the test. Threshold2, like Threshold1, may be based on a variety of vehicle and environmental factors such as fuel system temperature, wind speed, weather conditions, ground temperature etc., and may be selected such that if the difference between ground temperature and fuel system temperature is larger than threshold2, fuel system cooling may be increased upon raising the vehicle height. If the ground temperature is not greater than threshold2 above the fuel system temperature, or the ground temperature is not above another threshold, then method 400 proceeds to 415 where the vehicle height is maintained by maintaining the suspension height at the default or nominal height t. Method 400 then proceeds directly to 416 where the vacuum build phase of EONV testing is conducted. However, if at 412 the control system determines that the ground temperature is greater than the sum of the fuel system temperature and threshold2, method 400 proceeds to 413.

At 413, method 400 confirms suspension adjustments are enabled, as discussed earlier at 407. If suspension adjustments are not enabled, method 400 maintains vehicle suspension height at the driver specific default or nominal position, and moves to the vacuum build phase of the EONV test at 416. However, if suspension adjustments are enabled, method 400 proceeds to 414.

At 414, method 400 increases the vehicle suspension height, and thereby the vehicle height, by actuating the vehicle's active suspension system. Raising the suspension height may be proportional to the ground temperature, or the difference between the ground temperature and the fuel system temperature, so as to increase the amount of cooling air flow through the underbody and increase the distance of the fuel system from the hot ground surface. In one example, the vehicle is raised further from the ground as the ground temperature increases or the difference between the ground temperature and the fuel system temperature increases. Herein, the suspension height may be increased uniformly to raise the vehicle height at each wheel to the same extent. In other examples, the raising includes raising the vehicle height by raising the suspension height to a maximum extent, thus bringing vehicle height to the maximum height achievable. Herein the vehicle is raised as high as possible from the ground surface without damaging the suspension system components. In still further examples, active suspension vehicle raising may occur differentially or non-uniformly at one or more wheels (e.g., different at front wheels versus rear wheels) such that there may be a distinct extent of raising at each wheel of the vehicle. Therein, the vehicle may be raised such that the section of the underbody closest to the fuel tank is raised furthest from the ground surface as compared to other sections of the underbody. Upon completion of active suspension raising at 414, method 400 proceeds to conduct the vacuum build phase of EONV testing at 416. Even if suspension adjustments are not made and the vehicle is at the default or nominal height (as at 415), the method moves to 416 to conduct the vacuum phase of the EONV test.

At 416, a vacuum build phase of an EONV test may be conducted. This includes the controller once again sealing the fuel system from atmosphere by sending a control signal to closing the CVV, close the CPV, and open the FTIV. Subsequent to isolating the fuel system from atmosphere, a vacuum build may be monitored for a duration, such as for 45 minutes. For example, if sufficient cooling of the fuel tank occurs, the pressure in the fuel system may decrease as gases sealed within the system cool and fuel vapors condense. When vehicle height is also increased prior to the vacuum build phase, the increased distance from the hot ground surface as well as increased air flow around the vehicle underbody facilitate further fuel tank cooling, and thus enhance the rate and extent of vacuum build. If the vacuum builds to a predetermined threshold level, if the rate of vacuum build is higher than a threshold rate, or if the vacuum build follows an expected trajectory, the evaporative emissions test may pass on the vacuum build. However, if the vacuum build plateaus prior to reaching the predetermined vacuum threshold, if the rate of vacuum build is lower than the threshold rate, or if the vacuum build does not follow the n expected trajectory, the test is deemed failed and it may be inferred that the fuel system integrity is compromised. In one example, failing of either the vacuum build phase or the pressure build phase of the EONV test may cause the fuel system to be indicated as degraded. In other examples, if the vacuum build threshold is not met, the EONV test may continue monitoring the vacuum build trajectory until a specific duration of time has elapsed since the initiation of the vacuum build phase, the specified duration based on the energy content of the on-board energy storage device powering the actuation of the active suspension system. The duration may be increased as the battery state of charge increases. Once the vacuum build phase of the EONV test is concluded, the fuel system is vented by actuating the CVV and CPV open, and enabling the pressure within the fuel tank to return to atmospheric levels. Method 400 then proceeds to 417.

At 417 (after conducting the pressure and/or vacuum phase of the EONV test), method 400 records the result of the EONV evaporative emissions test and updates it in the memory of the controller. For example, recording the outcome of the EONV test may include recording a passing result of the evaporative emissions test at the controller, or recording a failing result of the evaporative emissions test at the controller. Responsive to a failing result of the evaporative emissions test, a flag, MIL, or diagnostic code may be set. Once the results of the tests are recorded, method 400 proceeds to 418.

At 418, method 400 may include adjusting engine operation, including updating a subsequent EONV test schedule, based on the result of the evaporative emissions test. For example, responsive to a pass result from the evaporative emissions monitor, subsequent evaporative emissions tests may be delayed or a frequency of EONV tests may be reduced. Alternatively, responsive to a fail result of the evaporative emissions test, subsequent evaporative emissions tests may be expedited or a frequency of EONV tests may be increased. Further, one or more engine operating parameters may be adjusted. For example, a maximum engine load may be reduced to reduce fuel consumption, cylinder enrichment may be reduced, and the vehicle may be propelled using more motor torque relative to engine torque. Method 400 then proceeds to 419.

At 419, method 400 includes resuming the vehicle height and suspension settings from before the EONV tests, such as a default height or a nominal height based on current vehicle conditions. Method 400 may then end.

In this way, a vehicle controller may adjust a vehicle suspension height responsive to a fuel system diagnostic test. For example, the adjusting may be performed responsive to scheduling of the test. The adjusting may include lowering the vehicle suspension height responsive to a pressure build-up phase of the diagnostic test, and/or raising the vehicle suspension height responsive to a vacuum build-up phase of the diagnostic test. Herein, the raising and lowering is from a default vehicle suspension height based on a driver requested drive mode. The vehicle suspension height may be further adjusted responsive to estimated ground temperature. For example, the vehicle suspension height may be lowered further from the default height during the pressure build-up phase of the diagnostic test as the estimated ground temperature increases, while the vehicle suspension height may be raised further from the default height during the vacuum build-up phase of the diagnostic test as the estimated ground temperature increases. In one example, the fuel system diagnostic test is a fuel evaporative system integrity test including the pressure build-up phase followed by the vacuum build-up phase, the fuel system isolated during each of the pressure build-up phase and the vacuum build-up phase, and the fuel system vented in between the pressure build-up phase and the vacuum build-up phase. Upon completion of the fuel system diagnostic test, the default height may be resumed. The adjusting may be selectively performed during a vehicle-off condition. Thus method 400 demonstrates how relatively hot ground surfaces can be utilized to increase the temperature shifts within the fuel system required for the fuel system pressure/vacuum builds needed for accurate EONV testing. The heat transfer in and out of the fuel system can be further enhanced by selectively parking the vehicle on the hottest accessible surface prior to initiating method 400. Such a selection can be made by determining the surface temperature of available parking locations via the thermal imaging sensors or cameras previously described. For example, as elaborated with reference to FIG. 5, during a vehicle-on condition immediately preceding the vehicle-off condition where the EONV test is conducted, the controller may infer or estimate a ground temperature within a threshold radius of the vehicle via on-board sensors and/or via an on-board camera of the vehicle. The controller may then select a parking location responsive to entry conditions for the fuel system diagnostic test being met, the parking location selected based on the inferred ground temperature. In case the vehicle is an autonomous vehicle, the controller may also drive the vehicle, without operator input, to the selected parking location, and then conduct the fuel system diagnostic test at the selected parked location. Turning to FIG. 5, a flow chart for an example method 500 for implementation by a vehicle capable of operating in an at least a partially autonomous mode is shown. Method 500 enables the selection of a parking location responsive to a request for conducting a fuel system integrity test, the parking location selected based on at least one of ground temperature, ambient temperature, and fuel system temperature.

Method 500 begins at 501, where it is evaluated whether autonomous vehicle parking is enabled. In one example, autonomous vehicle parking may be enabled responsive to a request being made directly by the vehicle driver. In another example, the vehicle's control system may enable autonomous parking of the vehicle (e.g., within a threshold radius of a current location) contingent upon selected conditions being met, such as the vehicle being keyed-off, the engine being shut down, and the vehicle being unoccupied.

At 502, method 500 includes evaluating current vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Also at 502, responsive to autonomous parking being enabled, a desired final parking destination may be determined based on driver settings including drive input and learned driver preferences. As one example, the final parking destination may be a default location associated with the current location of the vehicle (such as parking the car in the driver's garage when the vehicle is within a vicinity of the driver's house, or parking the car in a parking garage when the vehicle is within a vicinity of the driver's office). In another example, the final parking destination may be selected based on the output of a default algorithm applied during autonomous parking, such as selecting the nearest available parking location at a time of receiving the autonomous parking request. Driver input may include, for example, a specified parking location, such as a specific parking garage, or a specific spot or specific level in the parking garage, a specific address, GPS coordinates, etc. Driver input may further include driver preferences that are received from the driver via a button or touchscreen, or driver preferences that are learned iteratively. For example, a driver may indicate a preference for the vehicle to be autonomously parked in the nearest available parking location to the current location (or to a given location), at the cheapest available parking location, fastest accessible parking location, parking location with the lowest recorded crime rate, parking location within a specified radius of the current location, or combinations thereof. The preferences, including preferred final parking destinations, may also be learned at the control system as a function of commonly travelled destinations wherein the associated final parking destination may be geotagged into the controller's memory. For example, the controller may learn a first final parking destination associated with the driver's work location different from a second final parking destination associated with the driver's home location. In addition, each time a new destination is visited, preferences and selected parking destinations associated with the new destination may be learned and stored in the controller's memory. Method 500 then proceeds to 504. In the event that no autonomous parking request has been made, method 500 proceeds to 503 where a flag is set to retry method 500 at the next autonomous parking request. Method 500 may then end.

At 504, method 500 includes evaluating if EONV entry conditions have been met, as discussed earlier with reference to method 400 in FIG. 4. If EONV entry conditions have not been met, the vehicle control system proceeds to autonomously park the vehicle at the designated final parking destination as determined at 502. Method 500 then ends.

If entry conditions for an EONV test are met, at 505, method 500 includes accessing the vehicle control system's memory to retrieve one or more previously stored parking locations associated with EONV testing (herein also referred to as EONV testing locations) that are within a threshold radius of the current location or the final parking destination. The threshold radius may be a default radius or may be selected based on driver input. EONV testing locations may have been stored in memory subsequent to EONV tests being previously (successfully) conducted at those locations. The stored locations may possess one or more attributes capable of increasing EONV test robustness, such as high on-average ground temperatures, a ground surface type that retains and radiates heat (such as a blacktop), high wind flow, sun loading, etc. The EONV testing locations may be learned at the control system as a function of commonly travelled destinations and may be geotagged into the controller's memory. For example, the controller may learn a first EONV testing location associated with the driver's work location different from a second EONV testing location associated with the driver's home location. In addition, each time a new destination is visited, parking locations where an EONV test is conducted and completed may be learned and stored in the controller's memory as a function of the new destination.

After retrieving the one or more stored EONV testing locations from the controller's memory, at 507, method 500 includes determining if any of the stored EONV test location are currently accessible for autonomous vehicle parking. Such a determination may be made based on input received from vehicle camera systems, vehicle sensors or other spatial detection and analysis devices used for the autonomous vehicle operation, as well as navigation system input. In one example, a stored EONV testing location may be inaccessible due to the location being occupied by another vehicle or object, construction or road work being performed in a vicinity of the stored EONV testing location limiting access to the location, etc. In the event that the stored EONV test location is inaccessible, method 500 proceeds to 506 to select a new parking location, as described below. However if the stored EONV test location is accessible for vehicle parking, method 500 will proceed to 510 wherein the vehicle is autonomously driven to and parked at the selected EONV testing location prior to initiating EONV testing at 512.

If no stored locations for EONV testing are identified within the specified radius, or if the stored location is inaccessible, at 506, method 500 includes evaluating ground temperatures within a threshold radius (R) of the current location or the final parking destination. Determination of ground temperatures can be accomplished by direct measurement via vehicle sensors, inferred based on sensor readings, or estimated based on models or via data obtained from a wireless network. Sensors may include infrared sensors, on board camera systems, vehicle mounted temperature sensors, etc. As one example, the controller may use on-board cameras in an infra-red or greyscale color detection mode to identify a hottest location in the vicinity of the vehicle. The cameras may also be used to assess the ground surface type, such as to identify a ground surface that has the highest heat retention and radiation capacity. For example, the controller may use camera input to identify sections of the street that are made of asphalt. As another example, the controller may compare driveway concrete to driveway asphalt or garage concrete.

At 509, the estimated ground temperatures in the vicinity of the current location or final parking destination are compared to identify the location having the highest ground temperature. The location having the highest ground temperature is then selected as the new parking location for conducting EONV testing. By selecting the parking location for EONV testing that has the hottest surface available, radiant heat rejection from the ground to the vehicle's underbody can be maximized, improving the robustness of the subsequent EONV test. Herein, the selected parking location is a temporary parking location for conducting the fuel system integrity test, the temporary parking location distinct from an operator-selected final parking location of the vehicle.

In some examples, the ground temperatures may also be compared to a current fuel system temperature to identify a location where the ground temperature exceeds the fuel system temperature by greater than a threshold. The threshold temperature may be determined as a function of environmental and vehicle conditions, including fuel system temperature, ambient temperature, wind speed, weather conditions, etc., such that a ground temperature greater than the indicated threshold above the fuel system temperature indicates a potential for heat transfer from the ground to the fuel system, and that such heat transfer can be increased upon lowering of the vehicle height and decreased upon raising the vehicle height.

At 511 method 500 includes storing the current location of EONV testing for use in subsequent iterations of method 500. As an example, the new parking location may be stored and geotagged in the controller's memory including storing the attributes of the parking location such as a ground surface type, average temperature, and average sun loading. The new parking location may also be learned as a function of one or more of travel route, point of origin, and point of destination of the vehicle, the selected parking location updated responsive to a change in the travel route, the point of origin, or the point of destination of the vehicle. Further, the vehicle may be autonomously driven to the selected EONV testing location and parked there.

From each of 510 and 511, after parking the vehicle, autonomously at the selected location, the method moves to 512 to conduct an EONV test. Therein, suspension adjustments may be used to assist the EONV test, such as described in FIG. 4. Specifically, while conducting the EONV test at the selected parking location, the controller may apply active suspension adjustments to lower the vehicle height towards the ground during a pressure phase of the EONV test to maximize heat radiation from the ground to the fuel tank. Then, during the vacuum phase of the EONV test, the controller may apply active suspension adjustments to raise the vehicle height away from the ground to increase cooling air flow through the fuel system and maximize heat rejection from the fuel tank to the ambient air. As elaborated at FIG. 4, the lowering during the pressure phase and the raising during the vacuum phase may be adjusted based on the ground temperature. Following completion of the EONV test, test results may be stored in the controller's memory.

Upon completing and storing the result of the EONV test, method 500 proceeds to 513 wherein the vehicle controller and autonomously drives the vehicle to the final selected parking destination. In the event that the site of EONV testing was the same as the desired final parking destination, the vehicle remains parked. Method 500 may then end.

Figure 6:
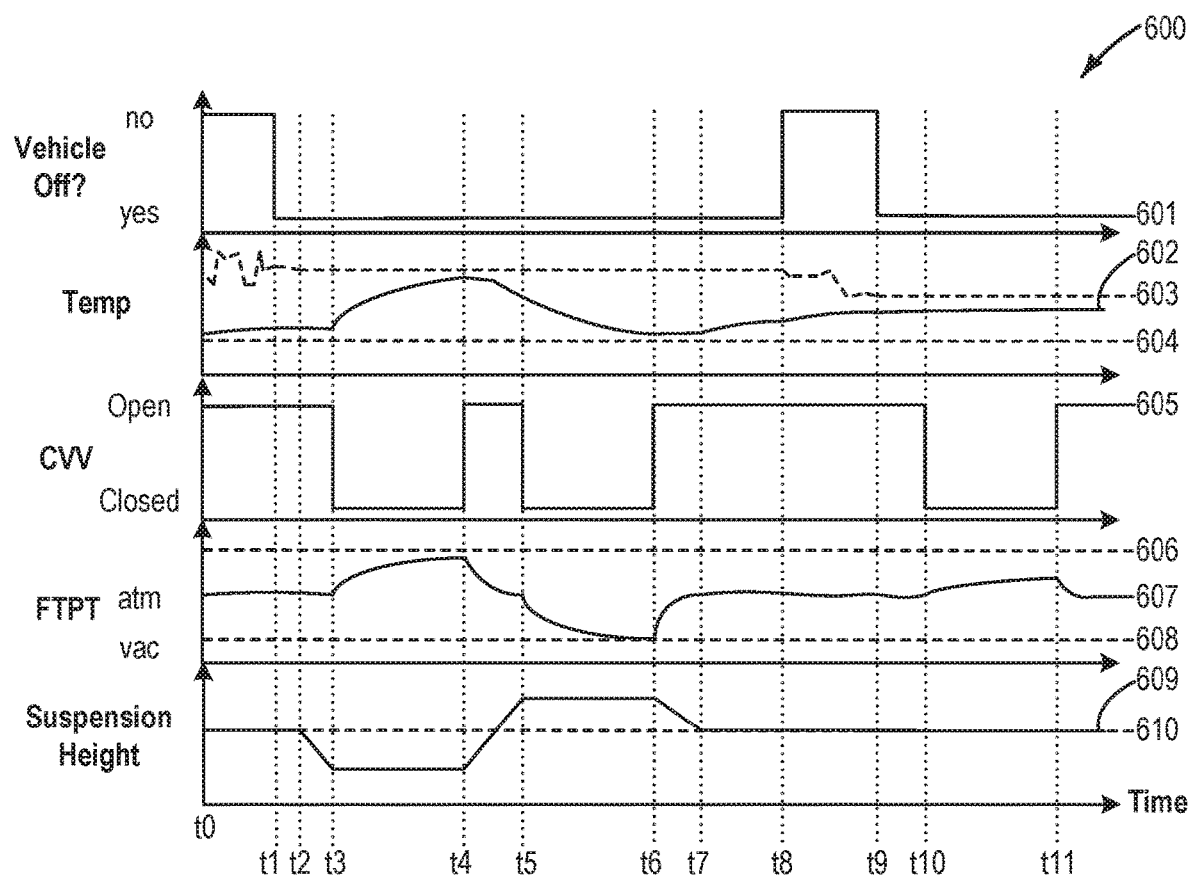
FIG. 6 shows a prophetic example of EONV testing utilizing suspension height adjustments.

In this way, a controller may operate a vehicle in an at least partially autonomous mode by a parking location responsive to a request for conducting a fuel system integrity test and further based on at least one of ground temperature, ambient temperature, and fuel system temperature. The selected parking location may be a temporary parking location for conducting the fuel system integrity test, the temporary parking location distinct from an operator-selected final parking location of the vehicle. The selected parking location may be learned as a function of one or more of travel route, point of origin, and point of destination of the vehicle, the selected parking location updated responsive to a change in the travel route, the point of origin, or the point of destination of the vehicle. In one example, where the vehicle includes an on-board camera, the selecting may include estimating the ground temperature within a threshold radius of the vehicle based on an output of the on-board camera; and selecting the parking location within the threshold radius having a highest estimated ground temperature or a highest difference between the fuel system temperature and the estimated ground temperature. The parking location may be further selected based on a ground construction material. The controller may then drive the vehicle to the selected parking location, park the vehicle, without operator input, at the selected parking location, adjust a vehicle suspension height based on the ground temperature; and conduct a fuel system integrity test. For example, the controller may lower a vehicle suspension height based on the ground temperature during a pressure phase of the test and raise the vehicle suspension height based on the ground temperature during a vacuum phase of the test. FIG. 6 shows an example timeline 600 for adjusting a vehicle height prior to a pressure and/or vacuum build phase of an EONV test to improve EONV test robustness. Timeline 600 includes plot 601, depicting whether a vehicle-off event is detected over time, and plot 602, depicting a fuel tank temperature over time. Traces 603 and 604 represent the ground temperature and ambient temperature, respectively. Timeline 600 further includes plot 605 depicting whether a canister vent valve (CVV), is open (fuel system open to atmosphere) or closed (fuel system sealed). Timeline 600 includes plot 607 depicting a pressure within the fuel system monitored by a fuel tank pressure transducer (FTPT). Line 606 represents a predetermined pressure threshold. Pressure builds during the pressure phase of EONV testing below this threshold may indicate leaks in the fuel system. Line 608 represents a predetermined vacuum threshold. Vacuum builds during the vacuum phase of EONV testing to a pressure above this threshold may indicate leaks in the fuel system. Finally, timeline 600 includes plot 609 depicting the vehicle height as a function of time, where line 610 indicates the driver specified default vehicle height, the vehicle height adjusted via corresponding changes to an active suspension height.

Between times t0 and t1, the vehicle is propelled with engine torque, and as the vehicle is driven around, heat rejection by the engine gradually increases fuel tank temperature as indicated by plot 602. Additionally, between times t0 and t1, as the vehicle drives over different surfaces having different surface conditions, the temperature of the ground beneath the vehicle changes as shown by 603, while the ambient temperature remains fairly constant, as shown by 604. As the engine is in operation, the CVV is open to the atmosphere as indicated by plot 605 so that fuel tank vapors can be absorbed at a canister before being vented. Fuel system pressure is at atmospheric pressure. Vehicle suspension height at this time is maintained at a driver specified default height 610.

At time t1, a vehicle-off event is detected, such as responsive to an operator key-off event. This includes propulsion of the vehicle being stopped, the engine shut-down and spun to rest, and the vehicle becoming unoccupied. For example, the operator may park the vehicle at a location and key-off. As a result of the vehicle-off event, the fuel tank pressure starts to drop and stabilize to atmospheric levels. Also at time t1, EONV entry conditions are met. Based on input from infrared sensors, vehicle camera systems, and temperature sensors, the ground temperature at the location where the vehicle is parked is determined to be significantly above both the ambient temperature and fuel system temperature, as seen by comparing plot 602 to each of plots 603, and 604. Thus, it is determined that supplemental heat transfer from the warmer ground surface to the fuel system may occur, and that the rate of heat transfer can be increased by reducing the distance between the vehicle's fuel tank and the warm ground.

At time t2, prior to beginning the pressure build phase of the EONV test, the vehicle height is decreased by actuating the active suspension system to lower the vehicle towards the ground, as indicated by plot 609. Between times t2 and t3, the active suspension system height is lowered to lower the vehicle height until at time t3, the vehicle height has reached a lowest possible height for the given ground surface.

At t3, once vehicle lowering is completed, the EONV test is started with the pressure build phase. Accordingly, the CVV is closed as indicated in plot 605. Also, a CPV is closed (not shown), thereby sealing the fuel system from atmosphere. Due to heat rejection from the engine, and additional heat rejection from the ground to the underbody of the vehicle, the fuel system pressure starts to rise, as indicated by the FTPT reading shown in 607. Between times t3 and t4 the pressure and temperature within the fuel system increase and eventually plateau at time t4.

At time t4, the pressure build (indicated by plot 607) within the sealed fuel system has plateaued below the pressure build threshold 606. Thus, the pressure build phase has concluded without meeting the minimum pressure build threshold needed to show an absence of leaks within the fuel system. To confirm fuel system degradation, the CVV is opened at t4 to vent the system, allowing the pressure within the fuel system to equilibrate to atmospheric pressure. Thereafter, the EONV test moves to a vacuum build phase of the test. Prior to initiating the vacuum phase of the test, between t4 and t5, the vehicle height is increased by actuating the active suspension system to raise the vehicle away from the ground, as indicated by plot 609. Between times t4 and t5, the active suspension system height is raised to raise the vehicle height until at time t5, the vehicle height has reached a highest possible height for the given active suspension system configuration. By raising the vehicle height, a distance between the fuel tank and the hot ground is increased, and additional cooling air flow through the underbody of the vehicle is enabled. As a result, heat rejection out the fuel tank is enhanced.

At time t5, after raising the vehicle to the desired height, the vacuum phase of the EONV test is initiated. Therein, the CVV (and CPV) are closed once again, sealing the fuel system. As the distance between the warm ground and the fuel tank has increased, and as ambient air is cooler than the fuel system, the temperature of the fuel system decreases between times t5 and t6. This cooling has been enhanced due to the greater clearance between the ground and underside of the vehicle, which facilitates increased airflow. Cooling of the fuel system between times t5 and t6 results in decreased fuel pressure as more of the fuel vapor condenses. Thus between times t5 and t6, pressure starts to drop and a robust vacuum build occurs, as seen in plot 607.

At time t6, the vacuum build has reached the threshold necessary for indicating an absence of leaks in the fuel system. Thus the EONV test is deemed to be complete, with the determination being made that the fuel system integrity is maintained. At time t6, upon completion of the EONV test, the CVV is opened, allowing the fuel system pressure to return to atmospheric pressure, as shown by plot 607. Simultaneously, the active suspension of the vehicle is actuated to return the vehicle to the default height. By time t7, the pressure within the fuel system has fully equilibrated with the atmosphere and the vehicle height has resumed its driver specified default position.

At time t8, vehicle propulsion is resumed responsive to a key-on event, as shown by plot 601. The engine is restarted and between times t8 and t9, the driver propels the vehicle using engine torque. As the vehicle drives over various ground surfaces with different temperatures, the ground temperature changes as displayed by plot 603. While the engine is operating, heat generated by the engine and exhaust is rejected into the fuel system, increasing the fuel system temperature, as shown by plot 602.

At time t9, another vehicle-off event is detected, indicated by plot 601. EONV test entry conditions are also met at time t9. Based on input from infrared sensors, vehicle camera systems, and temperature sensors, the ground temperature at the new vehicle-off location is determined to not be greater than a threshold above the fuel system temperature, as seen by comparing plots 603, 602, and 604 at t9. Thus, it is determined that heat transfer between the ground surface and fuel system may not add sufficient supplemental heat to improve the EONV robustness. Therefore, no vehicle height adjustments are made prior to beginning the pressure build phase of the EONV test at time t10. Specifically, the vehicle is maintained at the default height.

At time t10 of timeline 600, the fuel system is sealed by closing the CVV as indicated by plot 605. Between times t10 and t11, a pressure build occurs within the fuel system as indicated by plot 607. However, the pressure build between t10 and t11 is shallower than the corresponding pressure build between t3 and t4 where additional heat radiation from the hot ground was used to assist the pressure build. The pressure build plateaus below the pressure build threshold 606 causing the monitor to fail in the pressure phase. The pressure build phase then ends. At time t11 the CVV is opened to vent the fuel tank. It is determined that a fuel system leak is present. Timeline 600 then ends.

In this way, during a first vehicle-off condition, responsive to a first request for a fuel system diagnostic test and ground temperature within a threshold from fuel tank temperature, the controller may maintain suspension height. In comparison, during a second vehicle-off condition, responsive to a second request for the fuel system diagnostic test and ground temperature outside the threshold from the fuel tank temperature, the controller may adjust the suspension height. Further, during the first vehicle-off condition, the controller may conduct the fuel system diagnostic test responsive to the first request with the suspension height maintained, while during the second vehicle-off condition, the controller may conduct the fuel system diagnostic test responsive to the second request with the suspension height adjusted. The adjusting during the second vehicle-off condition may include lowering the suspension towards ground during a pressure build-up phase of the fuel system diagnostic test and/or raising the suspension further away from the ground during a vacuum build-up phase of the fuel system diagnostic test. The adjusting may be based on parameters estimated during the second vehicle-off condition, the suspension height lowered further towards the ground during the pressure build-up phase and/or raised further from the ground during the vacuum build-up phase as a difference between the ground temperature and the fuel tank temperature increases. As used herein, responsive to the first or the second fuel system diagnostic test includes responsive to entry conditions for a fuel system integrity test being met. In one example, the maintained suspension height during the first vehicle-off condition is a default suspension height based on an operator selected drive mode, while during the second vehicle-off condition, the suspension height is adjusted from the default suspension height when conducting the fuel system diagnostic test, the suspension height returned to the default suspension height upon completion of the fuel system diagnostic test.

In this way, ambient thermal conditions may be leveraged to improve the rate and extent of pressure generation within a sealed fuel system during the pressure build phase of EONV testing, and/or to improve the rate and extent of vacuum generation within a sealed fuel system during the vacuum build phase of EONV testing. By reducing a vehicle height via active suspension system adjustments, the pressure phase of the EONV test can be supplemented with tarmac or ground surface radiant heat, improving EONV test result reliability, and reducing EONV cycle time. Further, key-off battery power is preserved. By raising the vehicle height via active suspension system adjustments, air flow during the vacuum phase of the EONV test can be increased. Further, key-off battery power is preserved. Another advantage of this approach is that it reduces reliance of EONV tests on only heat rejection from the engine or exhaust by supplementing this heat with heat derived from external sources when possible. By increasing the extent of pressure and vacuum build, the duration of EONV tests may be shortened, on average, while reducing instances where an EONV test fails due to insufficient temperature change within the fuel tank. By facilitating both cooling and heating of the fuel tank utilizing systems already available on the vehicle, such as the suspension system, the reliance on additional equipment such as pumps, electric resistive heaters, etc., is reduced. By increasing test completion frequency, monitor compliance is improved.

The systems described herein and with reference to FIGS. 1-3, along with the methods described herein and with reference to FIGS. 4 and 5 may enable one or more systems and one or more methods. In one example a method comprises adjusting a vehicle suspension height responsive to a fuel system diagnostic test. In a first example of the method, adjusting suspension height responsive to a fuel system diagnostic test includes: lowering the vehicle suspension height responsive to a pressure build-up phase of the diagnostic test. A second example of the method optionally includes example one and further includes raising the vehicle suspension height responsive to a vacuum build-up phase of the diagnostic test. A third example of the method optionally includes one or more of examples one through two and further includes that the raising and lowering is from a default vehicle suspension height based on a driver requested drive mode. A fourth example optionally includes one or more of examples one through three and further includes that the vehicle suspension height is further adjusted responsive to estimated ground temperature. A fifth example optionally includes one or more of examples one through four and further includes that the vehicle suspension height is lowered further from the default height during the pressure build-up phase of the diagnostic test as the estimated ground temperature increases, and wherein the vehicle suspension height is raised further from the default height during the vacuum build-up phase of the diagnostic test as the estimated ground temperature increases. A sixth example of the method optionally includes one or more of examples one through five and further includes that the fuel system diagnostic test is a fuel evaporative system integrity test including the pressure build-up phase followed by the vacuum build-up phase, the fuel system isolated during each of the pressure build-up phase and the vacuum build-up phase, and the fuel system vented in between the pressure build-up phase and the vacuum build-up phase. A seventh example of the method optionally includes one or more of examples one through six and further includes resuming the default height upon completion of the fuel system diagnostic test. An eighth example of the method optionally includes one or more of examples one through seven and further includes during a vehicle-on condition immediately preceding the vehicle-off condition, inferring a ground temperature within a threshold radius of the vehicle via an on-board camera of the vehicle; selecting a parking location responsive to entry conditions for the fuel system diagnostic test being met, the parking location selected based on the inferred ground temperature; driving the vehicle, without operator input, to the selected parking location; and conducting the fuel system diagnostic test.

Another example a method comprises during a first vehicle-off condition, responsive to a first request for a fuel system diagnostic test and ground temperature within a threshold from fuel tank temperature, maintaining suspension height; and during a second vehicle-off condition, responsive to a second request for the fuel system diagnostic test and ground temperature outside the threshold from the fuel tank temperature, adjusting the suspension height. In a first example of the method, the method includes during the first vehicle-off condition, conducting the fuel system diagnostic test responsive to the first request with the suspension height maintained, and during the second vehicle-off condition, conducting the fuel system diagnostic test responsive to the second request with the suspension height adjusted, wherein the adjusting during the second vehicle-off condition includes lowering the suspension towards ground during a pressure build-up phase of the fuel system diagnostic test and/or raising the suspension further away from the ground during a vacuum build-up phase of the fuel system diagnostic test. A second example of the method optionally includes the first example and further includes that vehicle height adjusting is based on parameters estimated during the second vehicle-off condition, the suspension height lowered further towards the ground during the pressure build-up phase and/or raised further from the ground during the vacuum build-up phase as a difference between the ground temperature and the fuel tank temperature increases. A third example of the method optionally includes any one or more of examples one and two and further includes that responsive to the first or the second fuel system diagnostic test includes responsive to entry conditions for a fuel system integrity test being met. A fourth example of the method optionally includes one or more of examples one through three and further includes the maintained suspension height during the first vehicle-off condition is a default suspension height based on an operator selected drive mode, and wherein during the second vehicle-off condition, the suspension height is adjusted from the default suspension height when conducting the fuel system diagnostic test, the suspension height returned to the default suspension height upon completion of the fuel system diagnostic test.

Another method for a vehicle capable of operating in at least a partially autonomous mode comprises, selecting a parking location responsive to a request for conducting a fuel system integrity test, and further based on at least one of ground temperature, ambient temperature, and fuel system temperature. In a first example, the method includes that the selected parking location is a temporary parking location for conducting the fuel system integrity test, the temporary parking location distinct from an operator-selected final parking location of the vehicle. A second example of the method optionally includes example one and further includes that the selected parking location is learned as a function of one or more of travel route, point of origin, and point of destination of the vehicle, the selected parking location updated responsive to a change in the travel route, the point of origin, or the point of destination of the vehicle. A third example of the method optionally includes examples one and two and further includes that the vehicle includes an on-board camera, and wherein the selecting includes: estimating the ground temperature within a threshold radius of the vehicle based on an output of the on-board camera; and selecting the parking location within the threshold radius having a highest difference between the fuel system temperature and the estimated ground temperature. A fourth example of the method optionally includes examples one through three and further includes driving the vehicle to the selected parking location; parking the vehicle without operator input, at the selected parking location; adjusting a vehicle suspension height based on the ground temperature, and conducting a fuel system integrity test. A fifth example of the method optionally includes examples one through four and further includes that the parking location is further selected based on a ground construction material.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein. The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A method, comprising:
adjusting a vehicle suspension height responsive to a fuel system diagnostic test, wherein the adjusting includes lowering the vehicle suspension height responsive to a pressure build-up phase and raising the vehicle suspension height responsive to a vacuum build-up phase of the fuel system diagnostic test relative to a default vehicle suspension height based on a driver requested drive mode.

2. The method of claim 1, wherein the vehicle suspension height is further adjusted responsive to estimated ground temperature.

3. The method of claim 2, wherein the vehicle suspension height is lowered further from the default vehicle suspension height during the pressure build-up phase of the diagnostic test as the estimated ground temperature increases, and wherein the vehicle suspension height is raised further from the default vehicle suspension height during the vacuum build-up phase of the diagnostic test as the estimated ground temperature increases.

4. The method of claim 1, wherein the fuel system diagnostic test is a fuel evaporative system integrity test including the pressure build-up phase followed by the vacuum build-up phase, the fuel system isolated during each of the pressure build-up phase and the vacuum build-up phase, and the fuel system vented in between the pressure build-up phase and the vacuum build-up phase.

5. The method of claim 1, further comprising resuming the default vehicle suspension height upon completion of the fuel system diagnostic test.

\* \* \* \* \*